United States Patent
Lev et al.

(10) Patent No.: US 9,317,339 B2
(45) Date of Patent: Apr. 19, 2016

(54) SYSTEMS AND METHODS FOR IMPLEMENTING WORK STEALING USING A CONFIGURABLE SEPARATION OF STEALABLE AND NON-STEALABLE WORK ITEMS

(71) Applicant: Oracle International Corporation, Redwood City, CA (US)

(72) Inventors: Yosef Lev, New York, NY (US); Guy L. Steele, Jr., Lexington, MA (US)

(73) Assignee: Oracle International Corporation, Redwood City, CA (US)

( * ) Notice: Subject to any disclaimer, the term of this patent is extended or adjusted under 35 U.S.C. 154(b) by 245 days.

(21) Appl. No.: 13/800,097

(22) Filed: Mar. 13, 2013

(65) Prior Publication Data

US 2014/0282595 A1 Sep. 18, 2014

(51) Int. Cl.
*G06F 9/46* (2006.01)
*G06F 9/50* (2006.01)

(52) U.S. Cl.
CPC ...... *G06F 9/5083* (2013.01); *G06F 2209/5011* (2013.01)

(58) Field of Classification Search
None
See application file for complete search history.

(56) References Cited

U.S. PATENT DOCUMENTS

2009/0320027 A1* 12/2009 Ringseth et al. ............. 718/102
2012/0102501 A1* 4/2012 Waddington et al. ........ 718/105

OTHER PUBLICATIONS

Nimar S Arora, et al "Thread Scheduling for Multiprogrammed Multiprocessors" SPAA Jun. 1998, pp. 1-11.
David Chase, et al "Dynamic Circular Work-Stealing Deque" SPAA '05 Jul. 18-20, 2005 Sun Microsystems, pp. 1-8.
Danny Hendler, et al "A Dynamic-Sized Nonblocking Work Stealing Deque" Sun Microsystems, Nov. 2005, pp. 1-69.
Danny Hendler, et al "A Dynamic-Sized Nonblocking Work Stealing Deque" Springer-Verlag 2005, pp. 1-19.
James Dinan, et al "Scalable Work Stealing" SC'09 Nov. 14-20, 2009, pp. 1-11.

* cited by examiner

*Primary Examiner* — Emerson Puente
*Assistant Examiner* — Steven Do
(74) *Attorney, Agent, or Firm* — Robert C. Kowert; Meyertons, Hood, Kivlin, Kowert & Goetzel, P.C.

(57) ABSTRACT

A system may perform work stealing using a dynamically configurable separation between stealable and non-stealable work items. The work items may be held in a double-ended queue (deque), and the value of a variable (index) may indicate the position of the last stealable work item or the first non-stealable work item in the deque. A thread may steal a work item only from the portion of another thread's deque that holds stealable items. The owner of a deque may add work items to the deque and may modify the number or percentage of stealable work items, the number or percentage of non-stealable work items, and/or the ratio between stealable and non-stealable work items in the deque during execution. For example, the owner may convert stealable work items to non-stealable work items, or vice versa, in response to changing conditions and/or according to various work-stealing policies.

20 Claims, 13 Drawing Sheets

SYSTEMS AND METHODS FOR IMPLEMENTING WORK STEALING USING A CONFIGURABLE SEPARATION OF STEALABLE AND NON-STEALABLE WORK ITEMS

BACKGROUND

1. Field of the Disclosure

This disclosure relates generally to work stealing, and more particularly to systems and methods for implementing work stealing using a dynamically configurable separation between stealable work items and non-stealable work items.

2. Description of the Related Art

Load balancing when scheduling parallel applications is a difficult task, and work stealing is a widely used technique for addressing it. With this technique, each thread maintains its own local pool of work items, from which it consumes work items and into which it puts new work items that it generates during its execution. When a thread's own local work pool becomes empty, and only then, the thread is allowed to steal work items from the work pools of other threads. This technique has been used in many different contexts, programming languages, and on a wide variety of architectures.

Some common implementations for the thread's local pool are based on the double-ended queue (deque) data structure described by Arora, Blumofe, and Plaxton in 2001 (which is referred to herein as the ABP deque). Various successors and improvements of this algorithm are based on the same principle: the owner of the pool (deque) pushes and pops work items on one side of the deque, and the thieves steal work items from the other side of the deque. With this approach, the operations of the owner rarely conflict with the operations of the thieves, resulting in an efficient implementation for the local operations executed by the owner.

SUMMARY

The system and methods described herein may in some embodiments implement work stealing using a dynamically configurable separation between stealable and non-stealable work items in a pool of work items. For example, in some embodiments, work items generated by a given thread may be added to a double-ended queue (deque) that is owned by the given thread, and, in the common case, may be removed by the given thread (e.g., the owner thread) for processing. The value of a variable (e.g., an index) may indicate the position of the last stealable work item or the first non-stealable work item in the deque. In some embodiments, a thread that has run out of work items in its own deque (e.g., a thief) may steal one or more work items from the portion of another thread's deque that holds stealable items. However, only the owner of a deque may remove and process the non-stealable items in its deque.

In some embodiments, the owner of a deque may modify the number or percentage of stealable work items in the deque, the number or percentage of non-stealable work items in the deque, and/or the ratio between stealable and non-stealable work items in the deque during execution (e.g., in response to changing conditions and/or according to various work-stealing policies). For example, if the owner runs out of non-stealable work items in its deque, it may elect to convert one or more stealable work items in its deque (if any exist) into non-stealable work items. In another example, the owner of a thread may disable work stealing (e.g., temporarily) by converting all stealable work items in its deque to non-stealable work items. In yet another example, if there are not enough stealable work items in the deque of a given thread (e.g., not enough stealable work items to allow thieves to assist with the computation, according to an applicable work-stealing policy), the given thread may elect to convert one or more non-stealable work items into work items that are stealable.

In some embodiments, non-stealable work items may be stored in a pool of work items using a different representation than that used to represent stealable work items (e.g., without as much context as may be stored along with stealable work items in the pool). In some embodiments, non-stealable work items may be stored in a different structure than the structure in which stealable work items are stored until and unless their owner elects to convert them to the stealable work items. In various embodiments, different work-stealing policies may specify one or more conditions that trigger an operation to convert one or more work items that are not stealable into work items that are stealable, or vice versa. These triggers may be dependent on the current workload and/or on various system-wide, application-specific, and/or user configurable work-stealing policies or parameter values, in different embodiments.

Figure 1:
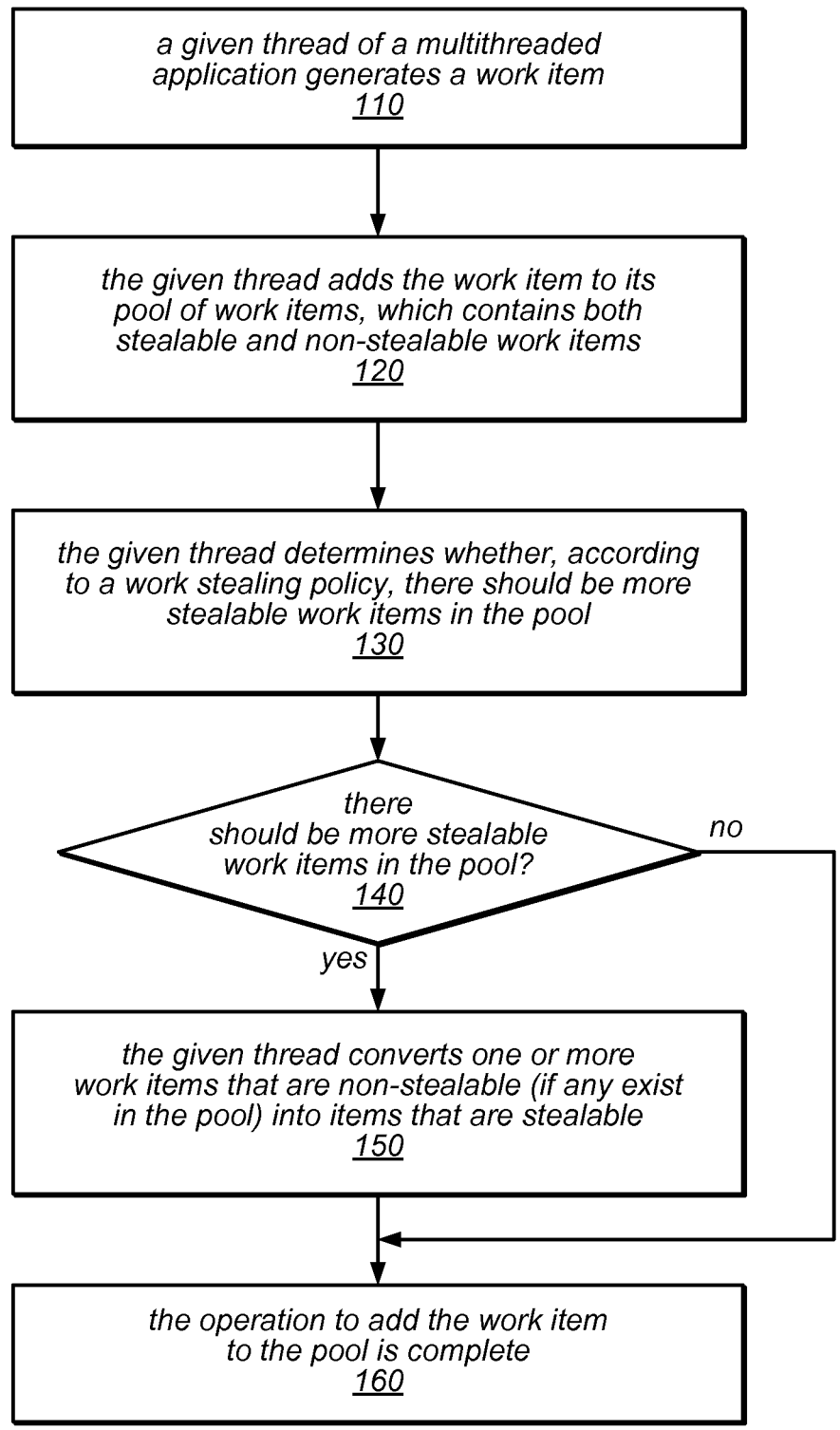
FIG. 1 is a flow diagram illustrating one embodiment of a method for dynamically configuring a pool of work items that includes stealable and non-stealable work items.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

The systems and methods described herein may, in various embodiments, be used to implement work stealing using a dynamically configurable separation between stealable work items and non-stealable work items in a pool of work items. For example, for each thread, the system may represent a local pool of work items as an array (e.g., a double-ended queue) of work items in which some of the work items are stealable (e.g., they may be executed by another thread that has exhausted its own local pool of work items) and other work items are not stealable (e.g., they may only be executed by the thread that owns the local pool). In some embodiments, the separation between the stealable work items and the non-stealable work items may be dynamically configured during runtime such that the number or percentage of stealable work items in the pool may be increased or decreased, the number or percentage of non-stealable work items may be increased or decreased in the pool, and/or the ratio between the number of stealable work items and the number of non-stealable work items in the pool may be changed, based on the current workload and/or various system-wide, application-specific, and/or user configurable work-stealing parameter values.

The ABP deque described herein (as well as its variants) has a significant drawback. That is, even though many of the operations performed by the owner of the deque are relatively inexpensive, the operation for removing a work item from the deque, even by the owner, requires a store-load memory barrier on most of the common architectures (e.g., those that provide a Total Store Order (TSO) memory model). This can significantly slow down the average and/or aggregate operations on the deque by the owner, for some applications. One existing work-stealing algorithm that addressed this issue (i.e., that removed the need for a memory barrier) was the "Indempotent Work Stealing" algorithm described by Michael, Vechev, and Saraswat in 2009. Unfortunately, avoiding the memory barrier in that algorithm came with a cost of weakening the semantics of the work stealing algorithm, allowing an item to be removed twice from a deque, in some cases (e.g., once by the owner and once by a thief). While this may be acceptable for some applications of work stealing, it is clearly not an acceptable situation for many others. In some embodiments, the systems described herein may significantly reduce the number of memory barriers required to be run by the owner of a deque. More specifically, the systems described herein may significantly reduce the number of local pop operations that need to execute a memory barrier in a system that only provides the TSO memory model. This can lead to a significant performance improvement for many systems that employ work stealing. In some embodiments, the systems described herein may also provide a more flexible interface for the owner of the deque with respect to the kinds of operations it can perform on the work items and/or the amount of information it needs to store with these items. In some embodiments, the systems described herein may separate stealable and non-stealable work items in the local pools (e.g., the deques) of each thread, which may result in avoiding unnecessary races when there are enough elements in the deque(s).

Work stealing is a widely used for load balancing when scheduling parallel applications. As previously noted, with this technique, each thread maintains its own local pool of work items. Each thread adds new work items (e.g., work items that it generates during its execution) to its own local pool and consumes work items (e.g., executes work items) from its own local pool. When a thread's work pool becomes empty, and only then, it is allowed to steal work items from the local pools of other threads. In some applications of work stealing, a high level assumption is that execution of a work item usually leads to generation of multiple additional work items. Under this assumption, stealing may be very rare. This is because once a thread steals a work item, executing this work item is likely to produce one or more additional work items that will also be put in the thread's local pool. Therefore, the next item can be taken from the local pool and there may not be any need to do any stealing. Therefore, in some embodiments it may be advantageous for a work stealing pool to support very efficient operations for the owner to add work items to the pool and to remove work items from the pool, while providing an operation for other threads to concurrently steal items from the pool that may or may not be as efficient.

As noted above, in 2001, Arora, Blumofe, and Plaxton described a work stealing pool implementation that is based on a double-ended queue (deque), in which the thread that owns the deque pushes and pops elements (e.g., work items) to and from one end of the deque (e.g., the bottom of the deque), while other threads (referred to herein as thieves) steal elements (e.g., work items) from the other side of the deque (e.g., the top of the deque). This implementation is referred to herein as the "ABP work-stealing deque", or the "ABP deque". By having the owner and the thieves operate on different sides of the deque, the ABP deque provides the owner with an efficient local push operation that does not require the use of a synchronization primitive (such as a compare and swap type operation, or CAS) or a hardware transactional memory implementation (HTM), and also with an efficient local pop operation, e.g., one that only resorts to using a CAS type synchronization primitive when there is a risk that both the owner and a thief are trying to remove the last element from the deque. Unfortunately, because the memory model for most modern architectures does not support sequential consistency, the local pop operation in the ABP algorithm still needs to execute at least one store-load memory barrier in order to determine whether there could be a race between the owner and a thief over the last element that would need to be resolved using a CAS type operation. Thus, in the ABP algorithm, even when there are many elements in the deque, the owner still incurs the overhead of the memory barrier (which may be non-negligible on some architectures) just to confirm that the queue still has enough elements to avoid the use of the CAS type operation.

Unlike the original ABP algorithm (which used a fixed size array and did not deal with overflows), one variant of the ABP deque (which may be referred to as the Chase-Lev deque) extends the ABP deque with the ability to grow if it overflows, while maintaining the efficiency of the local operations for the owner. Other extensions to the original ABP algorithm provide better cache locality, or the ability to steal multiple items at once. However, none of these algorithms removes the need for a store-load memory barrier for the local pop operation on architectures that support only the Total Store Order (TSO) memory model rather than full sequential consistency.

In various embodiments, the systems described herein may implement work stealing using a variant of the ABP algorithm that significantly reduces the number of memory barriers executed by local pop operations (e.g., those performed by the owner thread). In particular, using these techniques, the owner can separate the stealable work items from the non-stealable work items in its local pool of work items, thus avoiding any possible race with a thief. In some embodiments, the separation may be maintained dynamically by the owner, e.g., the owner can convert non-stealable work items into stealable work items, or vice versa. In some embodiments, the only time that a memory barrier is required may be when converting stealable work items into non-stealable work items, and this may typically be done only when the owner has run out of non-stealable work items. Therefore, there may be a tradeoff to be made between the frequency with which a memory barrier is required to be executed by the owner, and the amount of help the owner can get from other threads. For example, if the owner makes only a small fraction of its work items stealable, then it will execute very few memory barriers. However, in this case, the owner may be limiting the amount of help it can get from the thieves, which cannot steal non-stealable work items. In some embodiments, the owner may be able to control this trade-off dynamically. For example, in some embodiments, the owner may configure its local work pool such that only a small fraction of the work items are stealable, and may subsequently convert one or more additional work items (e.g., work items that were non-stealable) to stealable work items only if and when the owner notices that all of the stealable work items have been stolen (or that the number or percentage of stealable work items has dropped below a pre-determined threshold for stealable work items in its local pool).

One embodiment of a method for dynamically configuring a pool of work items that includes stealable and non-stealable work items is illustrated by the flow diagram in FIG. 1. As illustrated at 110, in this example, the method may include a given thread of a multithreaded application generating a work item. The method may include the given thread adding the work item to its pool of work items, which contains both stealable and non-stealable work items, as in 120. In some embodiments, all newly created work items may be added to the portion of the pool of work items that contains non-stealable work items. In other embodiments, newly created work items may be added to the portion of the pool of work items that contains non-stealable work items or to the portion of the pool of work items that contains stealable work items, dependent on an observed or expected workload, a system-wide, application-specific, or user-configurable work stealing policy and/or the value of a parameter of a system-wide, application-specific, or user-configurable work stealing policy.

As illustrated in this example, the method may include (e.g., at some point in time subsequent to adding the work item to the pool of work items) the given thread determining whether, according to one or more applicable work stealing policies, there should be more stealable work items in the pool of work items, as in 130. If the given thread determines that there should be more stealable work items in the pool of work items, shown as the positive exit from 140, the method may include the given thread converting one or more work items that are non-stealable (if any exist in the pool) into items that are stealable, as in 150, after which the operation to add the work item to the pool may be complete. In some embodiments, determining whether there should be more stealable work items in the pool of work items and/or converting one or more non-stealable work items into stealable work items may be performed by a procedure, method, or function invoked by the given thread (from within an operation to add a work items to the pool of work items). For example, in one embodiment, all of the operations illustrated as elements 120-160 of FIG. 1 may be performed as part of a push operation that is invoked automatically (e.g., programmatically) in response to the given thread creating a work item. As illustrated in this example, if the given thread determines that there should not be more stealable work items in the pool of work items, shown as the negative exit from 140, the operation illustrated at 150 may by skipped, and the operation to add the work item to the pool of work items may be complete, as in 160.

In some embodiments, in addition to the performance benefit achieved by removing most of the memory barriers, the work-stealing techniques described herein (e.g., the techniques described herein for dynamically configuring and maintaining a separation between stealable and non-stealable work items in a local pool) may provide additional benefits. For example, in some embodiments, non-stealable work items may be stored in a different representation than stealable work items (e.g., non-stealable work items may be stored in a representation that is more efficient for the owner thread to work with than the representation in which stealable work items are stored), and the non-stealable work items may be converted to the less-efficient representation of stealable work items only if and when necessary (e.g., when a work item is converted from being non-stealable to stealable by the owner). In particular, it may often be the case that the thread that generates a given work item has a lot of the context that is necessary to execute the given work item. However, if the given work item is stealable, all of this context may need to be stored together with the work item and be accessible to all other threads (e.g., the potential thieves). In some embodiments, by making the majority of the work items non-stealable, this overhead may be avoided for most of the work items (which may be unlikely to be stolen, in practice). Moreover, employing a different representation for the non-stealable work items may result in a more flexible interface for the owner. For example, this may support the ability of the owner to remove non-stealable work items from any position in the pool (e.g., they may not necessarily be removed from the end of a deque), to read multiple non-stealable work items using a single operation, and/or to group and pop multiple non-stealable work items together as if they were a single, larger work item, in various embodiments.

In some embodiments, the techniques described herein for dynamically configuring and/or maintaining a separation between stealable and non-stealable work items may allow thieves to steal multiple work items using a single steal operation with almost no additional complexity to the algorithm, especially if the owner puts an upper bound on the number of work items that can be stolen using a single steal operation. For example, in some such embodiments, a successful steal operation that steals multiple work items may need to employ only one successful CAS type operation, just as when a steal operation steals a single work item.

In some embodiments, the use of the techniques described herein for dynamically configuring and/or maintaining a separation between stealable and non-stealable work items may result in reducing the number or percentage of cache misses in the presence of steal operations. For example, in the original ABP algorithm, each steal operation causes the next operation by the owner to suffer at least one cache miss. However, in some embodiments, using the techniques described herein, an owner may incur a cache miss only when converting one or more work items from stealable work items to non-stealable work items, or vice versa.

The original ABP deque is described below, followed by a description of one embodiment of a variant of the ABP deque that allows a dynamically configurable separation and conversion between stealable and non-stealable work items.

Note that the pseudo code included herein is written in a C/C++ style, in which an assignment such as "s1=s2" (where s1 and s2 are of a structure type) copies all the structure's fields from s2 to s1. Note also that the examples described herein may assume the use of the Total Store Order (TSO) memory model, which is implemented by most modern architectures. With this memory model, the architecture is not allowed to reorder two load (read) operations, or two store (write) operations, but if a load from one location appears after a store to another location, they may be reordered such that the load will take effect before the store. Note that this may be the reason that a memory barrier is necessary in code in which it is crucial that a load done after a store will only execute after the store has been performed and is visible to all other threads. Also note that both the original ABP deque and the variants described herein may be adjusted to work with weaker memory models (e.g., by adding additional memory barriers), in different embodiments. Finally, note that while the descriptions of a work stealing technique in which the owner can dynamically configure the separation between stealable and non-stealable work items included herein are based on the ABP deque implementation, one skilled in the art will appreciate that these techniques may be applied to many other variants and extensions of the ABP deque, including, but not limited to, the Chase-Lev work stealing deque.

The ABP work stealing deque is implemented using an array that is configured to hold the work items. The deque also maintains two indexes that bound the non-empty slots in the deque: the bottom index points to the next available slot in the array where a work item can be added, and the top index indicates the next slot from which an element can be stolen. In the ABP deque, the work items reside in array positions array[top] through array[bottom−1], inclusive. Note that the number of work items may be zero. In the ABP deque, the variable holding the bottom index can be modified only by the owner thread of the deque. The variable holding the top index is usually modified only by the thieves, but it can also be modified by the owner thread. Therefore, in the ABP deque, modifications to the top index are done using a hardware synchronization primitive (such as a compare and swap type operation, or CAS), e.g., to address any races between multiple threads that try to modify the top index at the same time. To avoid the ABA problem associated with using a CAS type operation, the variable holding the top index also holds a version number that is incremented whenever the top index may be updated to a value that it has previously held.

The following example pseudo code may be used to implement the ABP deque.

```
class ABPDeque {
  // Data members (state)
  //
  WorkItem array[ARRAY_SIZE];
  int bottom;
  IndexAndVersion topInfo;
public:
  // Push a work item onto the bottom of the deque.
  // This method is to be called only by the deque owner.
  //
  void Push(WorkItem item) {
    array[bottom] = item;
    bottom++;
  }
  // Steal an element from the top of the deque.
  // This method may be called by multiple threads
  // (e.g., the owner or thieves).
  //
  WorkItem Steal( ) {
    IndexAndVersion ti = topInfo;
    int b = bottom;
    if (ti.index >= b) return EMPTY;
    WorkItem retVal = array[ti.index];
```

-continued

```
    IndexAndVersion new_ti = ti;
    new_ti.index++;
    if (CAS(&topInfo, ti, new_ti)) return retVal;
    return ABORT;
  }
  // Pop a work item from the bottom of the deque.
  // This method is to be called only by the deque owner.
  //
  void Pop(WorkItem item) {
    if (bottom == 0) return EMPTY;
    bottom--;
    membar-store-load( );
    IndexAndVersion ti = topInfo;
    WorkItem retVal = array[bottom];
    if (bottom > ti.index) return retVal;
    // At this point, the pop operation is trying to remove the last element
    // from the deque, unless the deque is already empty.
    // This code addresses potential races with thieves, and resets the
    // bottom and top (in that order) to point to the
    // beginning of the array, so that the cells
    // from which work items were stolen can be reused.
    //
    IndexAndVersion new_ti = {0, ti.version + 1};
    Int b = bottom;
    bottom = 0;
    if (b == ti.index) {
      if (CAS(&topInfo, ti, new_ti)) return retVal;
    }
    topInfo = new_ti;
    return EMPTY;
  }
};
```

As illustrated in the example pseudo code above, the local Push operation for the ABP deque stores a new element (e.g., a new work item) at the array cell indicated by the bottom variable, and increments the value of the bottom variable (i.e., the bottom index).

As illustrated in the example pseudo code above, the Steal operation for the ABP queue has to coordinate with other stealing threads (e.g., other thieves) as well as with the owner thread. Therefore, it uses a compare and swap type operation (CAS) to modify the topinfo variable. More specifically, the Steal operation begins by reading the top index and version number into a local variable ti, and then reads the bottom variable to determine whether the ABP deque is empty. If it is (e.g., is bottom<=top index), the Steal operation returns the special EMPTY value. Otherwise, it reads the work item pointed to by the top index (array [ti.index]), and tries to advance top to point to the next element in the array. Note that because this change always increases the top index, there is no risk of encountering the ABA problem, and hence there is no need to increment the version portion of topInfo, in this case. If the CAS operation succeeds in advancing the top index, then the value read from the array is returned. Otherwise, the CAS operation must have failed because of a concurrent Pop or Steal operation that popped the work item read earlier from the array. In the case of such a failure, the work stealing system can simply retry the Steal operation on the same ABP deque, or can choose to attempt to steal a work item from another ABP deque. To provide this flexibility, the Steal operation simply returns the special value ABORT, which indicates a failure to steal a work item due to a race with a concurrent operation. This allows the caller to decide whether to retry stealing from the same ABP deque or to move to another ABP deque.

Finally, as illustrated in the example pseudo code above, the local Pop operation for the ABP deque tries to remove an element from the bottom of the ABP deque by decrementing the bottom variable (if its value is not already zero, indicating that the ABP deque is empty), and reading the content of the array cell indicated by the new value of the bottom variable. However, some care must be taken due to a potential race with a concurrent Steal operation that might be trying to steal the last element of the array. Note that this may be the only case in which a Steal operation and a local Pop operation try to remove the same element from the ABP deque.

To address this issue, the Pop operation of the ABP deque begins by decrementing the bottom variable, and then reading the top variable to determine whether a Steal operation removed, or is trying to remove, the last element of the ABP deque. Note that with the ABP deque, the update to the bottom variable must occur before the read of the top variable to ensure that any future Steal operation, which might read and modify the top variable after the Pop operation reads it, will see the new value of the bottom variable. This is the reason that the store-load memory barrier is necessary, i.e., to guarantee that the result of the store operation is visible to other threads before the read of the top variable is performed.

As illustrated in the pseudo code above, after the value of the top variable is read, the owner thread determines whether the value of the top variable is strictly smaller than the new value of the bottom variable. If it is, than the next successful Steal operation will remove a different work item than the work item read by the current Pop operation. Therefore, there is not a race condition and the value read from array[bottom] can be returned. Otherwise, either top>bottom, in which case a Steal operation already removed the last element from the deque and the pop operation needs to return EMPTY, or top==bottom, in which case a possible race with a concurrent Steal operation must be addressed (e.g., a race with a concurrent Steal operation that may try to update top and steal the last element). In both of these cases the pop operation may need to update both bottom and top to point to the beginning of the array, as the deque will be empty by the end of the Pop operation. However, in the case in which top==bottom, this update must be performed using a CAS type operation. In this manner, if there is a concurrent Steal operation that is about to increment the top index, either the Pop operation or the Steal operation (but not both) will succeed in updating the top index and removing the last element from the deque. If top>bottom, then a steal operation has already stolen the last element from the deque, and thus no other steal operation may successfully modify top until the owner executes a Push operation. Thus, the update to topinfo can be done without a CAS type operation. Finally, note that because the update of topinfo may decrement its index, the Pop operation for the ABP deque needs to increment the version number of topinfo to avoid the ABA problem.

A work pool that dynamically configures and/or maintains a separation between stealable and non-stealable work items is described below, according to various embodiments. In some embodiments, the pool uses the same data structure as the ABP deque except that it includes an additional index to mark the boundary between stealable and non-stealable work items. One skilled in the art can appreciate that this technique may be used with different data structures in different embodiments, some of which are briefly mentioned herein.

An ABP deque variant that dynamically configures and/or maintains a separation between stealable and non-stealable work items is described in more detail below, according to one embodiment. Note that the main additions to the original ABP algorithm are the use of a topMax variable and the perhapsAddStealableWorkItems and convertStealableToNonStealable methods. In this example, the topMax varable indicates the index position separating stealable items from non-stealable items. As with the original ABP deque, the work items reside in array positions array[top] through array [bottom−1], inclusive. However, in this example, the stealable work items are held in one portion of the array while the non-stealable work items are held in another portion of the array. Specifically, the stealable work items reside in array positions array[top] through array[topMax−1], inclusive, and the non-stealable work items reside in array positions array [topMax] through array[bottom−1], inclusive. Note that the number of stealable work items may be zero, and that the number of non-stealable work items may be zero, at various times and in various embodiments. In this example, from the point of view of the thieves, the topMax variable serves as the equivalent of bottom in the original ABP algorithm in that it marks the end of the region where stealable work-items reside. While non-stealable work items may reside at and after that index, from the point of view of the thieves these elements do not exist (since they cannot be stolen). Like the bottom variable, the topMax can be modified only by the owner of the deque, in this example.

The following example pseudo code may be used to implement an ABP deque variant that dynamically configures and/ or maintains a separation between stealable and non-stealable work items, according to one embodiment.

```
class ABPDequeWithStealableNonStealableSeparation {
  // Data members (state)
  //
  WorkItem array[ARRAY_SIZE];
  int bottom;
  int topMax;
  IndexAndVersion topInfo;
public:
  // Push a work item to the bottom of the deque.
  // This method is to be called only by the deque owner.
  //
  void Push(WorkItem item) {
    array[bottom] = item;
    bottom++;
    perhapsAddStealableWorkItems( );
  }
  void perhapsAddStealableWorkItems( ) {
    IndexAndVersion ti = topInfo;
    int tmax = topMax;
    int numStealable = tmax − ti.index;
    if (numStealable <= Threshold) {
      // If the number of stealable work items is lower than some pre-determined
      // threshold, this method can convert non-stealable work items to stealable
      // work items by incrementing tmax. The amount by
```

```
        // which it is incremented, as well as the Threshold
        // value that triggers the increment, may be dependent on the
        // particular work-stealing policy being used. Note that this method cannot
        // add more than (bottom – tmax) work items, however.
        // Therefore the function calcNumStealableToAdd must
        // return an integer value not less than 0 and not
        // greater than its second argument.
        //
        topMax += calcNumStealableToAdd(numStealable, bottom – tmax);
    }
}
// Steal an element from the top of the deque.
// May be called by multiple threads (e.g., the owner or thieves).
//
WorkItem Steal( ) {
    IndexAndVersion ti = topInfo;
    int tmax = topMax;
    if (ti.index >= tmax) return EMPTY;
    WorkItem retVal = array[ti.index];
    IndexAndVersion new_ti = ti;
    new_ti.index++;
    if (CAS(&topInfo, ti, new_ti)) return retVal;
    return ABORT;
}
// Pop a work item from the bottom of the deque.
// This method is to be called only by the deque owner.
//
void Pop(WorkItem item) {
    if (bottom == 0) return EMPTY;
    bottom––;
    WorkItem retVal = array[bottom];
    if (bottom >= topMax || convertStealableToNonStealable( )) {
        return retVal;
    } else {
        return EMPTY;
    }
}
bool convertStealableToNonStealable( ) {
    assert(bottom == topMax – 1);
    // Read top
    //
    IndexAndVersion ti = topInfo;
    int numStealable = topMax – ti.index;
    if (numStealable == 0) {
// (*)
    // Nothing to convert
    //
    // Since this method was called from within a Pop operation only when the owner
    // ran out of non-stealable items (*), this means that the deque is empty.
    // Therefore, this method resets the indexes and returns false.
    //
    bottom = topMax = 0;
    top = {0, ti.version + 1};
    return false;
}
// Move topMax to reduce the number of the stealable work items. The new
// number of stealable work items is decided by a helper function, reduceNumStealable,
// that returns the new number of stealable work items. The new number of stealable
// work items is always strictly lower than the old number of stealable work items, or
// in some cases, the new number may be zero, indicating that no stealing is allowed.
// Therefore, the function reduceNumStealable must return an integer value that is
// not less than 0 and strictly less than its argument.
//
int newNumStealable = reduceNumStealable(numStealable);
topMax = ti.index + newNumStealable;
membar-store-load( );
ti = topInfo;
// In the common case, no concurrent steal operations stole or may be trying to steal
// the work items being converted. Therefore the method is finished, and returns true.
//
if (ti.index < topMax) return true;
// Here, the top index is >= topMax, so no more stealing is allowed for now.
// This method tries to update topInfo's version to prevent any ongoing Steal operation
// that has seen the old value of topMax, but has not yet executed its CAS operation,
// from succeeding.
//
IndexAndVersion new_ti = {ti.index, it.version + 1};
CAS(&topInfo, ti, new_ti);
// Here, topInfo can no longer change. If the CAS succeeded,
```

-continued

```
// then any concurrent Steal operation that has seen the
// old value of topMax will fail updating topInfo. If the
// CAS failed, then some concurrent Steal operation
// successfully updated topInfo after topMax was updated.
// Hence, any other Steal operation will have to retry
// and will see the new value of topMax,
// which is <= topInfo.index (and hence does not allow any
// stealing).
// Thus, all that is left to be done is to update topMax to be
// equal to the new value of topInfo.index, and determine whether
// the deque is empty afterward.
//
ti = topInfo;
topMax = ti.index;
if (bottom < topMax) { // (*)
  // Here, the deque is empty, so this method resets the indexes and returns false.
  //
  bottom = topMax = 0;
  top = {0, ti.index+1};
  return false;
}
  return true;
  }
};
```

In the example pseudo code above, the local Push function is very similar to the original ABP Push operation, except that it calls the perhapsAddStealableWorkItems function. This additional function may convert some of the non-stealable work items to stealable ones, in some cases. Note that calling the perhapsAddStealableWorkItems from each Push operation is only one of many options for converting non-stealable work items to stealable work items. In other embodiments, the perhapsAddStealableWorkItems may be called only occasionally to make sure that there are enough stealable work items in the deque to allow other threads to help with the computation. In some embodiments, this function may be executed separately from the Push operation. For example, it may be called periodically (e.g., with a pre-determined frequency), or in response to a notification from the thieves indicating that there are not enough stealable work items in the deque, in different embodiments.

Figure 2:
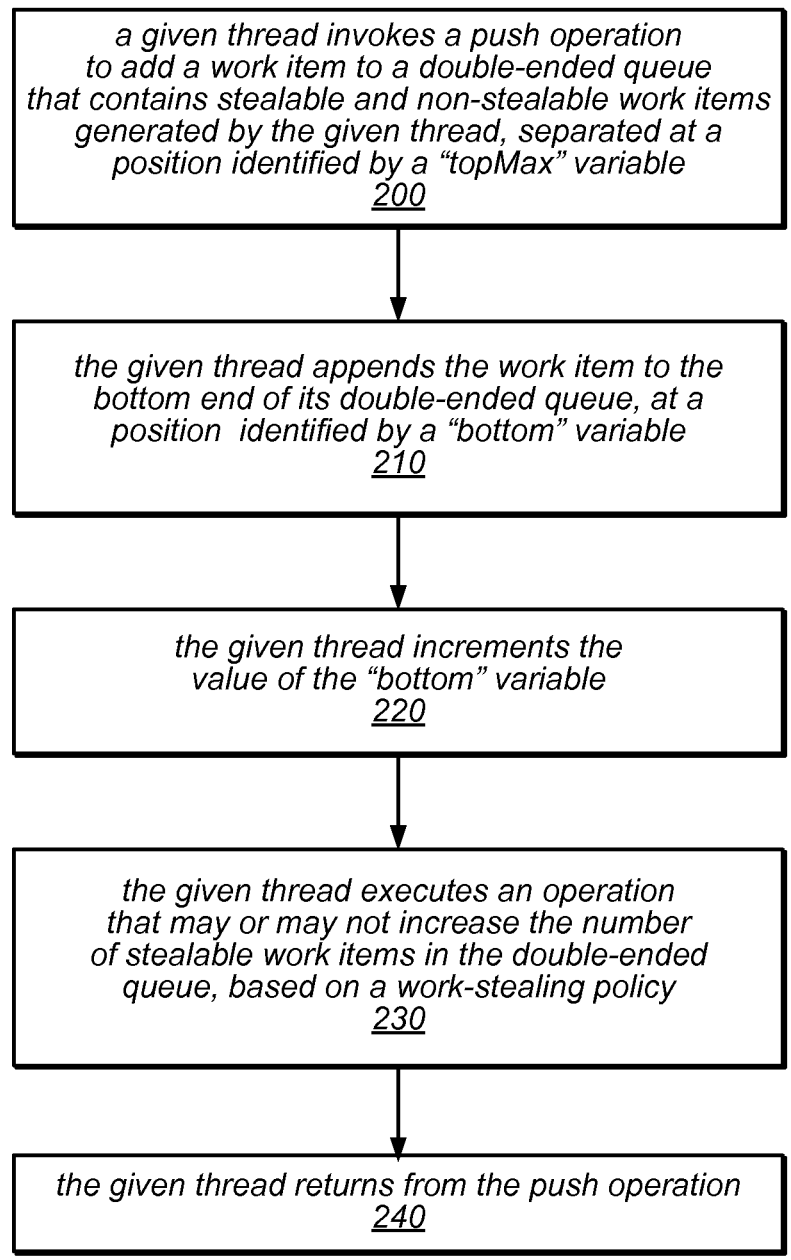
FIG. 2 is a flow diagram illustrating one embodiment of a method for adding a work item to a double-ended queue (deque) that includes both stealable and non-stealable work items.

One embodiment of a method for adding a work item to a double-ended queue (deque) that includes both stealable and non-stealable work items is illustrated by the flow diagram in FIG. 2. As illustrated at 200, in this example, the method may include a given thread invoking a push operation to add a work item to a double-ended queue. The double-ended queue contains stealable and non-stealable work items that were generated by the given thread, and that are separated at a position identified by a "topMax" variable. For example, the value of this variable may mark the end of the region where stealable work-items reside in the double-ended queue (e.g., by serving as an index to the first non-stealable work item in the double-ended queue). In this example, the method also includes the given thread appending the work item to the bottom end of its double-ended queue, at a position identified by a "bottom" variable, as in 210, and the given thread incrementing the value of the "bottom" variable, as in 220.

As illustrated in this example, the method may include the given thread executing an operation that may or may not increase the number of stealable work items in the double-ended queue, based on one or more applicable work-stealing policies as in 230, after which the given thread may return from the push operation, as in 240. For example, in some embodiments, the given thread may invoke a method, procedure, or function (such as the "perhapsAddStealableWorkItems" function described herein) from within the push operation (e.g., as part of the execution of every push operation) to determine whether the number of stealable work items should be increased and, if so, to increase it.

In the example pseudo code above, the perhapsAddStealableWorkItems function determines the number of stealable work items that are in the deque, and if it is below a predetermined threshold, it converts some non-stealable work items to stealable work items by moving topMax towards bottom. The amount by which topMax is moved, as well as the value of the threshold, may vary in different embodiments and from one system to another, and is abstracted away in the pseudo code above by the call to the calcNumStealableToAdd function.

Note that the more items that are converted to be stealable, the more help is allowed from the thieves. However, the more items that are converted to be stealable, the more often stealable work items may need to be converted back to non-stealable ones because the owner ran out of non-stealable items to process. In one embodiment, for example, a work-stealing policy may be to only update topMax when there are no stealable items left (e.g., with Threshold=0), but the amount by which to increment topMax may be determined based on the frequency at which this happens. For example, the deque may begin by adding very few work items to the stealable portion of the deque, but if these are quickly stolen it may decide to add a more work items to the stealable portion of the deque the next time, and so on. There are many other possible work-stealing policies, and the policy that is applied may vary depending on the system that is using the work-stealing algorithm, the application, and/or a user preference (e.g., it may be a system-wide, application-specific, or user-configurable policy).

Figure 3:
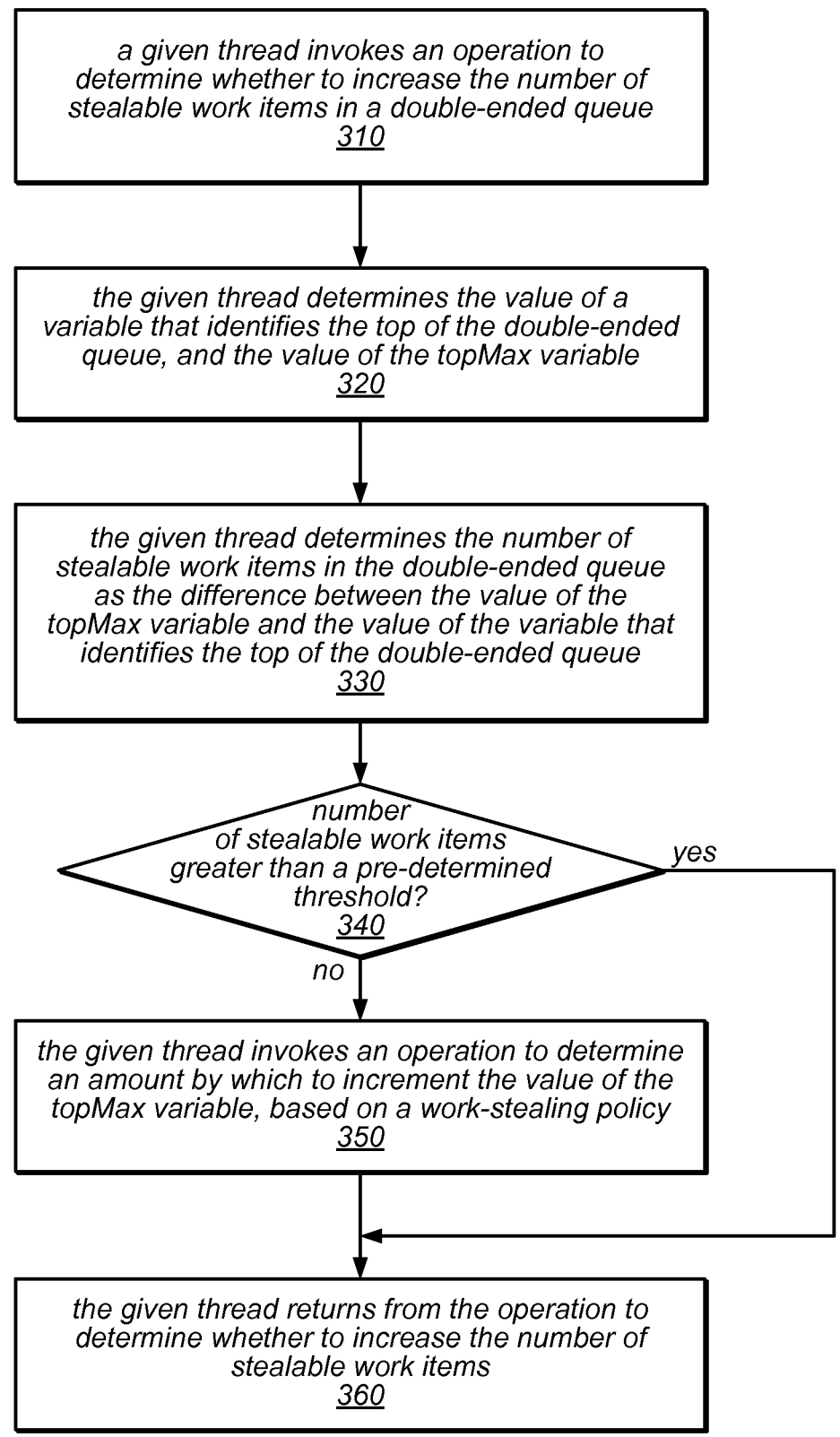
FIG. 3 is a flow diagram illustrating one embodiment of a method for determining whether to increase the number of stealable work items in a pool of work items and, if so, to increase it.

One embodiment of a method for determining whether to increase the number of stealable work items in a pool of work items and, if so, to increase it is illustrated by the flow diagram in FIG. 3. As illustrated at 310, in this example, the method may include a given thread invoking an operation to determine whether to increase the number of stealable work items in a double-ended queue that contains (or is configured to contain) both stealable and non-stealable work items. The method may include the given thread determining the value of a variable that identifies the "top" of the double-ended queue, and the value of a "topMax" variable that identifies the separation between a portion of the double-ended queue that contains stealable work items and a portion of the double-ended queue that contains non-stealable work items, as in 320. As illustrated in this example, the method may include the given thread determining the number of stealable work items in the double-ended queue as the difference between the value of the topMax variable and the value of the variable that identifies the top of the double-ended queue, as in 330.

As illustrated in this example, if the number of stealable work items is not greater than a pre-determined threshold (shown as the negative exit from 340), the method may include the given thread invoking an operation to determine an amount by which to increment the value of the topMax variable, based on an applicable work-stealing policy (e.g., a system-side, application-specific, or user-configurable work-stealing policy), as in 350, after which the given thread may return from the operation to determine whether to increase the number of stealable work items in the double-ended queue (as in 360). On the other hand, if the number of stealable work items is greater than a pre-determined threshold (shown as the positive exit from 340), the operation illustrated at 350 may be skipped, and the given thread may return from the operation to determine whether to increase the number of stealable work items in the double-ended queue (as in 360) without increasing the number of stealable work items in the double-ended queue.

Note that in this example, the pool of work items is represented by a deque that is similar in structure to the ABP deque. In other embodiments, the pool of work items may be represented by another type of array that includes (or is associated with) a variable or other construct whose value indicates a point or position of separation between stealable and non-stealable work items. In still other embodiments, the pool of work items may be represented by another type of list of work items (ordered or not), that includes an indication of which (if any) are stealable, and an operation or function may be called determine whether to increase the number of stealable work items and to make that happen (e.g., using whatever means are necessary for the particular structure of the pool).

While in this example, the determination of whether (and/or by how much) to increase the number of stealable work items in the double-ended queue is dependent on a pre-determined threshold for the minimum number of stealable work items in the double-ended queue, in other embodiments, such a determination may be dependent on the number of non-stealable work items in the deque, the ratio between the number of stealable work items and non-stealable work items, the frequency at which the number of stealable and/or non-stealable items needs to be increased and/or other criteria.

In the example pseudo code above, the local Pop operation is significantly simpler than that of the original ABP algorithm in the common case, e.g., when the value of bottom is greater than the value of topMax. In that case, all that Pop needs to do is decrement bottom and read the value from the index indicated by the new value of bottom. Because bottom is still in the non-stealable portion of the deque, there is no need for any synchronization with the thieves, and hence no need to include a memory barrier or any CAS type operations to perform the pop operation.

In the case in which the Pop operation cannot find any non-stealable work items to process, it calls the convertStealableToNonStealable function, which attempts to move some work items from the non-stealable portion of the deque to the stealable portion of the deque. Again, the number of work items to be converted may be dependent on the particular work-stealing policy that is being applied, and a determination of this number is abstracted away in the code by the call to the reduceNumStealable function. This function receives (as input) the current number of stealable work items, and returns a new number of stealable items (e.g., the number to which the number of stealable work items should be reduced).

Figure 4:
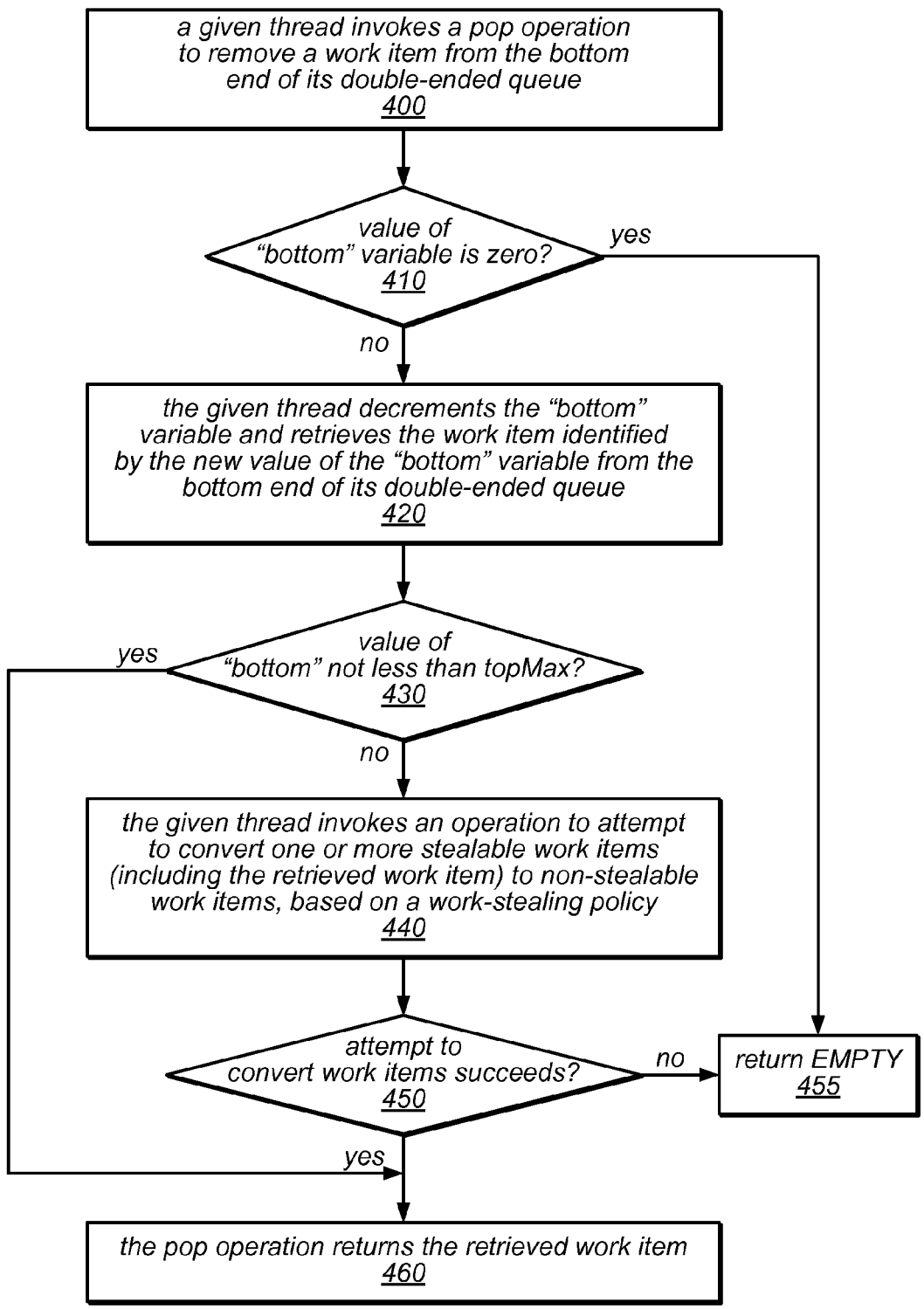
FIG. 4 is a flow diagram illustrating one embodiment of a method for removing a work item from a pool of work items that includes both stealable and non-stealable work items.

One embodiment of a method for removing a work item from a pool of work items that includes both stealable and non-stealable work items is illustrated by the flow diagram in FIG. 4. As illustrated at 400, in this example, the method may include a given thread invoking a pop operation to remove a work item from the bottom end of its double-ended queue (e.g., a double-ended queue into which the given thread adds the work items that it generates). As illustrated in FIG. 4, if the value of the "bottom" variable is zero (shown as the positive exit from 410), this may indicate that the double-ended queue is empty, and the method may include the given thread returning from the pop operation with a result of EMPTY, as in 455. On the other hand, if the double-ended queue is not empty (shown as the negative exit from 410), the method may include the given thread decrementing the "bottom" variable and retrieving the work item identified by the new value of the "bottom" variable from the bottom end of its double-ended queue, as in 420. If the value of the "bottom" variable is not less than the value of the topMax variable (shown as the positive exit from 430), the method may include the given thread returning from the pop operation with the retrieved work item (as in 460).

As illustrated in FIG. 4, if the value of the "bottom" variable is less than the value of the topMax variable (shown as the negative exit from 430), this may indicate that the retrieved work item is a stealable work item that was still in the double-ended queue or that was already stolen by another thread. In either case, the method may include the given thread invoking an operation to attempt to convert one or more stealable work items (including the retrieved work item) to non-stealable work items, based on one or more applicable work-stealing policies (as in 440). If the attempt to convert one or more stealable work items into non-stealable work items is not successful (shown as the negative exit from 450), this may indicate that the retrieved work item was already stolen by another thread. In this case, the method may include the given thread returning from the pop operation with a result of EMPTY, as in 455. If the attempt to convert one or more stealable work items into non-stealable work items is successful (shown as the positive exit from 450), the method may include the given thread returning from the pop operation with the retrieved work item, which is now non-stealable (as in 460).

Note that, in this example, the Pop operation removes work items for processing from the bottom end of the deque (which is the portion of the deque in which non-stealable work items are held). In cases, all of the work items in the deque may be non-stealable or all of the work items may be stealable. As described in more detail below, in some embodiments, if all of the work items in the deque are non-stealable, they might not be held in the array/deque at all and/or the pop operation might not be required to pop work items from one end of the array/deque, but might be configured such that it is able to remove any work item from the portion of the array/deque that contains non-stealable work items for processing.

Again note that while in this example, the pool of work items is represented by a deque that is similar in structure to the ABP deque, in other embodiments, the pool of work items may be represented by another type of array that includes (or is associated with) a variable or other construct whose value indicates a point or position of separation between stealable and non-stealable work items or the pool of work items may be represented by another type of list of work items (ordered or not), that includes an indication of which (if any) are stealable, and an operation or function may be called to attempt to convert one or more stealable work items (if any exist) to non-stealable work items (e.g., using whatever means are necessary for the particular structure of the pool).

In the example pseudo code above, the Steal function is very similar to that of the original ABP algorithm, except that it checks the value of topMax instead of the bottom variable to determine whether the stealable portion of the deque is empty.

Figure 5:
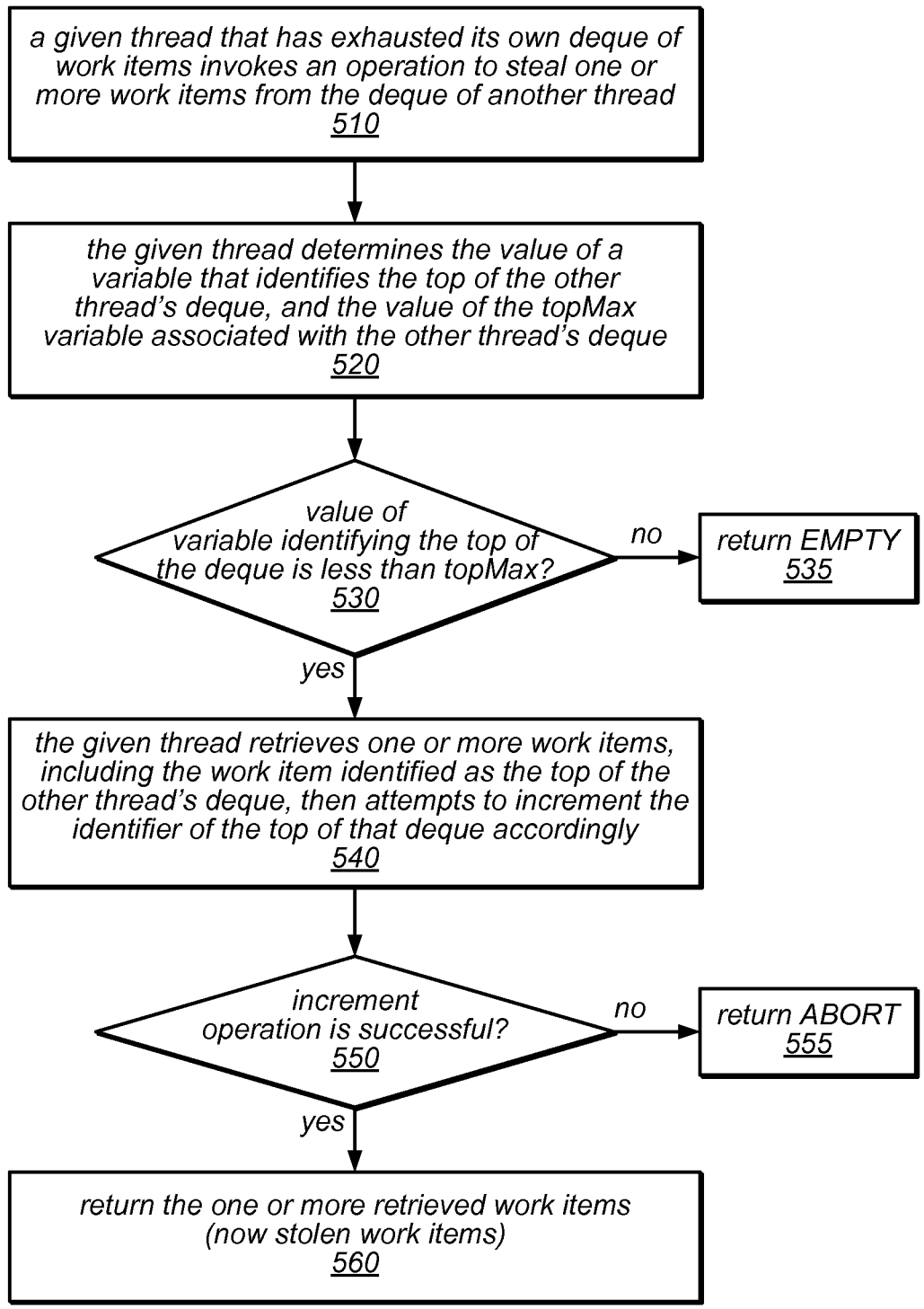
FIG. 5 is a flow diagram illustrating one embodiment of a method for stealing a work item from the pool of work items belonging to a different thread.

One embodiment of a method for stealing a work item from the pool of work items belonging to a different thread is illustrated by the flow diagram in FIG. 5. As illustrated at 510, in this example, the method may include a given thread that has exhausted the work items in its own pool of work items (e.g., a double-ended queue configured to store work items) invoking an operation to steal one or more work items from the double-ended queue of work items of another thread. The method may also include the given thread determining the value of a variable that identifies the "top" of the other thread's double-ended queue, and the value of the "topMax" variable associated with the other thread's double-ended queue, as in 520. If the value of the variable identifying the top of the other thread's double-ended queue is less than the value of its topMax variable (shown as the negative exit from 530), this may indicate that there are stealable work items in the double-ended queue. In this case, the method may include the given thread returning from the steal operation with a result of EMPTY, as in 535.

As illustrated in this example, if the value of the variable identifying the top of the other thread's double-ended queue is not less than the value of its topMax variable (shown as the positive exit from 530), the method may include the given thread retrieving one or more work items, including the work item that was identified as being at the top of the other thread's double-ended queue, and then attempting to increment the identifier of the top of the other thread's double-ended queue accordingly (e.g., to indicate the work item that is the new top of that double-ended queue), as in 540. For example, in some embodiments, this operation may be performed using a CAS type operation. Note that, in some embodiments, a thread may only steal one work item from the double-ended queue at a time (e.g., within a single steal operation). In other embodiments, a thread may be able to steal multiple work items at a time (e.g., within a single steal operation), up to a pre-determined upper bound on the number of work items that can be stolen at once. However, in no case may a thread steal more work items than are present in the portion of another thread's double-ended queue that contains stealable work items.

As illustrated in FIG. 5, if the attempt to increment the identifier of the top of the other thread's double-ended queue is not successful (shown as the negative exit from 550), the method may include the given thread returning from the steal operation with a return value of ABORT, as in 555. For example, the CAS operation may fail if the other thread (e.g., the owner thread) or another thief removed one or more of the work items at approximately the same time (or since the given thread started its attempt to steal them). However, if the attempt to increment the identifier of the top of the other thread's double-ended queue is successful (shown as the positive exit from 550), the method may include the given thread returning from the steal operation with the one or more retrieved work items (now stolen work items), as in 560.

Again note that while in this example, the pool of work items is represented by a deque that is similar in structure to the ABP deque, in other embodiments, the pool of work items may be represented by another type of array that includes (or is associated with) a variable or other construct whose value indicates a point or position of separation between stealable and non-stealable work items or the pool of work items may be represented by another type of list of work items (ordered or not), that includes an indication of which (if any) are stealable. In general (e.g., regardless of the structure used to represent the work pool), a thread that does not own a given work item (e.g., a thread that did not create the given work item and/or add it to the pool of work items) can steal (or at least attempt to steal) the given work item if it resides in the portion of the pool that contains stealable items (or is otherwise designated as stealable), but in order to succeed, the steal operation must determine that the given work item is not also being removed by the owner (or another thief) at the same time.

In the example pseudo code above, the convertStealableToNonStealable function is assumed to be called from inside the Pop operation, and only when the owner thread has run out of non-stealable items to process. As illustrated in this example, this function is called after the Pop operation has decremented the bottom variable. At this point, the array element pointed to by the bottom variable is now in the stealable region, such that (bottom==topMax−1), as stated by the assertion at the beginning of the function. As illustrated in this example, the convertStealableToNonStealable function attempts to convert at least the work item in the array element to which the bottom variable is pointing, assuming that the deque is not empty. Note, however, that converting stealable work items to non-stealable work items may in some cases be useful even if the portion of the deque that holds non-stealable work items is not empty. For example, in some embodiments, it may be useful to disable stealing from a particular deque for some period of time. In such embodiments, the pseudo code for the convertStealableToNonStealable function may be modified for this purpose e.g., by making changes in two or three places in the function that are marked with (*) in a comment in the code and are described in more detail below.

As illustrated in this example, the convertStealableToNonStealable function may begin by reading the topinfo variable and calculating the current number of stealable work items in the deque. If there are none, then the method fails. In this case, because the function was called from within the Pop operation when there were no non-stealable work items, this means that the deque is empty. Therefore, this function resets the values of the bottom variable, topMax, and the top, variable, and returns with a value of false. Note that in embodiments in which the convertStealableToNonStealable function is modified so that it can be called when there are still be some non-stealable items in the deque, a test may be added at this point to determine whether (bottom>topMax), and these indexes may be reset only if it is not.

As illustrated in this example, if there are some stealable items, the convertStealableToNonStealable function may be configured to decide how many stealable work items to leave for the thieves after the conversion (e.g., by calling a reduceNumStealable function), and to update topMax appropriately. Note that the actual number of stealable work items after the update to topMax may in some cases be lower than what was returned by the reduceNumStealable function, because the top index might have been incremented between the time it was read at the beginning of the convertStealableToNonStealable function and the time that topMax was updated. However, as long as there is at least one stealable work item after topMax is update, then there is no risk of having a concurrent Steal operation stealing a work item that was converted from stealable to non-stealable. This is because the top variable can be incremented by at most one after topMax is written and, after that point, any Steal operation will see the new value of topMax.

In this example, to determine how many stealable work items there are after updating topMax, the function may re-read topInfo, after executing a store-load memory barrier between the update of topMax and the read of topInfo. In the common case, the new value of topInfo, stored in the variable ti, will indicate that there are still some stealable work items in the deque after the update, in which case the function is finished with its work (e.g., the conversion succeeded) and the function returns a value of true. In the case that there not any stealable work items left in the deque following the update of topMax, the function attempts to update the version number portion of the topInfo variable to prevent any ongoing Steal operation that might have seen the old value of topMax from incrementing the top index and returning an element that is now non-stealable.

In the example pseudo code above, regardless of whether the CAS operation succeeds, after executing the CAS operation, the convertStealableToNonStealable function will need to re-read topInfo, and since topMax<=topInfo.index at this point, and because top has just been modified, no stealing will be done. Note that if the CAS failed, then it must be because of a concurrent update to the top index that happened after topMax was updated. Here again, any additional Steal operation will see the new topMax value and will not update topInfo. Therefore, in this example, once the CAS operation has been executed, all that is left to be done by the convertStealableToNonStealable function is set topMax to be equal to the new value of the top index, and then determine whether there are any non-stealable items left in the deque. Note that in this case, this is done by determining whether bottom>=topMax, and not by determining whether bottom>topMax. This is because the convertStealableToNonStealable function was called from within the Pop operation after the bottom variable was decremented, so it may now point to a valid, non-stealable item. If there are not any non-stealable items (e.g., if bottom<topMax), the convertStealableToNonStealable function will reset all of the indexes and return false. Otherwise it will return true. Note that in an embodiment in which the convertStealableToNonStealable function is called from outside of a Pop operation, the if statement shown above should determine whether bottom<=topMax, rather than whether bottom<topMax. This is because, except for the special case in which the convertStealableToNonStealable function is called during the execution of the Pop operation, the fact that top=topMax=bottom does indicate an empty deque.

Figure 6:
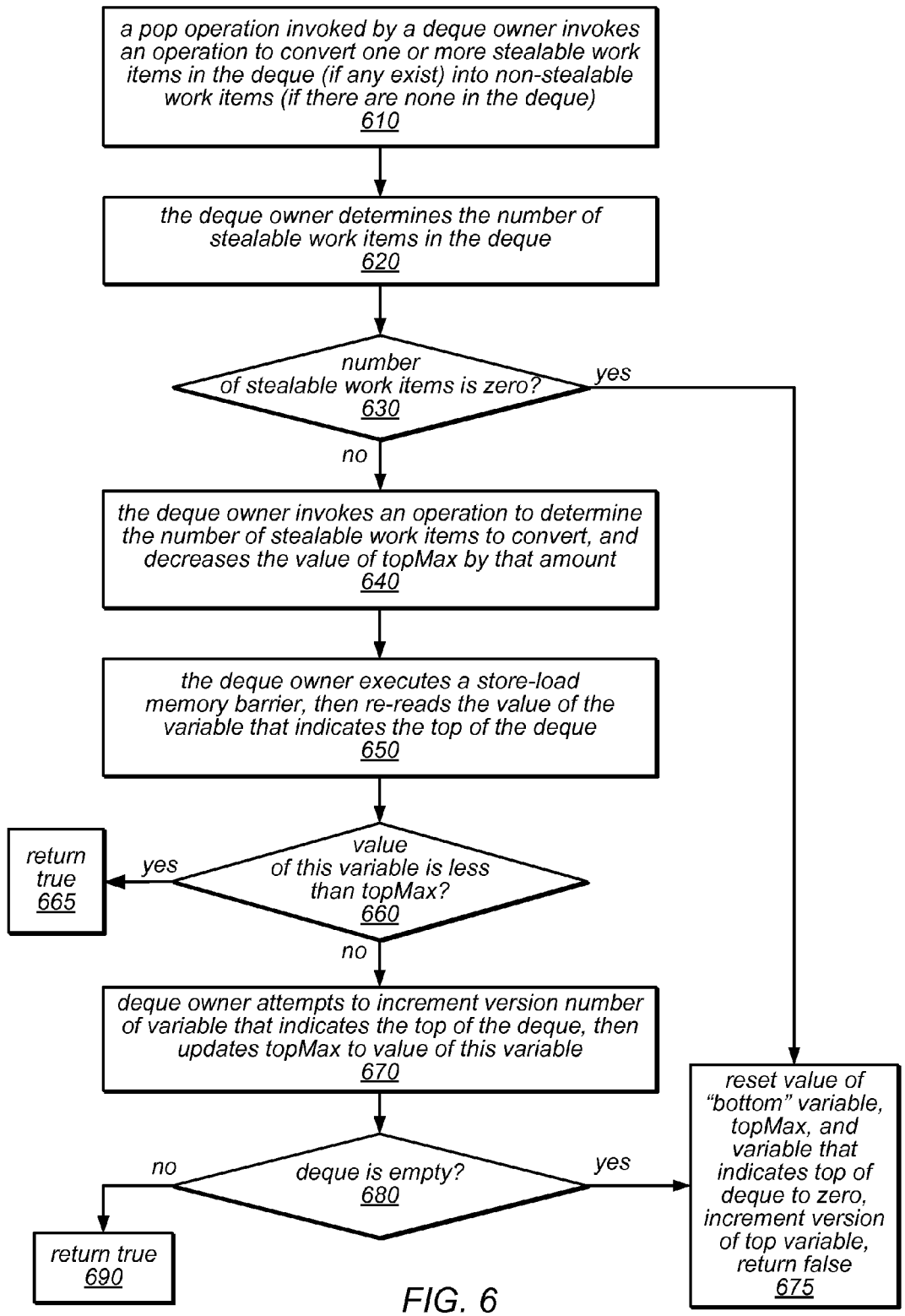
FIG. 6 is a flow diagram illustrating one embodiment of a method for converting stealable work items to non-stealable work items.

One embodiment of a method for converting stealable work items to non-stealable work items is illustrated by the flow diagram in FIG. 6. As illustrated at 610, in this example, the method may include a pop operation that was invoked by a deque owner invoking another operation to convert one or more stealable work items in the deque (if any exist) into non-stealable work items (e.g., if there are no non-stealable work items in the deque). The method may also include the deque owner determining the number of stealable work items in the deque (as in 620). For example, in some embodiments, the number of stealable work items may be calculated as the difference between the value of the topMax variable for the deque and the value of the variable identifying the top of the deque, as previously described.

As illustrated in FIG. 6, if the number of stealable work items is zero (shown as the positive exit from 630), the method may include the deque owner resetting the value of its "bottom" variable, the value of the variable that indicates the top of the deque, and the value of the topMax variable to zero, incrementing the version number of the variable that indicates the top of the deque, and then returning from the operation to convert stealable work items into non-stealable work items with a return value of false (as in 675). This is because the deque must be empty, in this case. However, if the number of stealable work items is non-zero (shown as the negative exit from 630), the method may include the deque owner invoking an operation (e.g., an operation such as the reduceNumStealable function described herein) to determine the number of stealable work items to convert to non-stealable work items, and to decrease the value of the topMax variable by that amount (as in 640). In some embodiments, the number of work items to be converted may be dependent on the particular work-stealing policy that is being applied, e.g., it may be may be dependent on an observed or expected workload, a system-wide, application-specific, or user-configurable work stealing policy and/or the value of a parameter of a system-wide, application-specific, or user-configurable work stealing policy. As illustrated in this example, the method for converting stealable work items to non-stealable work items may also include the deque owner executing a store-load memory barrier, and then re-reading the value of the variable that indicates the top of the deque, as in 650.

If the value of this variable is less than the value of the topMax variable (shown as the positive exit from 660), the method may include returning from the operation to convert stealable work items into non-stealable work items with a return value of true (as in 665). On the other hand, if the value of this variable is not less than the value of the topMax variable (shown as the negative exit from 660), the method may include the deque owner attempting to increment the version number of the variable that indicates the top of the deque, and then updating the value of the topMax variable to the value of this variable (as in 670).

As illustrated in this example, if the deque is empty at this point (shown as the positive exit from 680), the method may include the deque owner resetting the value of the "bottom" variable, the value of the variable that indicates the top of the deque, and the value of the topMax variable to zero, incrementing the version number of the variable that indicates the top of the deque, and then returning from the operation to convert stealable work items into non-stealable work items with a return value of false (as in 675). On the other hand, if the deque is not empty (shown as the negative exit from 680), the method may include the deque owner returning from the operation to convert stealable work items into non-stealable work items with a return value of true (as in 690).

As previously noted, in some embodiments, the techniques described herein for implementing work stealing using a dynamically configurable separation between stealable and non-stealable work items may be modified to allow a Steal operation to steal multiple items using a single update of the top index. In some embodiments, this modification may include setting an upper bound on the number of items that may be stolen in a single Steal operation. For example, if S represents such an upper bound, the only change to the Steal operation may be that the thief has to increment the top index by more than one. However, the thief must increment the top index by no more than min (S, topMax−topInfo.index), so that the new value of the top index will not exceed the value read from topMax.

In some embodiments, to allow the Steal operation to steal multiple items using a single update of the top index, in addition to modifying the Steal operation, the convertStealableToNonStealable function may also need to be modified to deal with the fact that the top index may be incremented by more than one. Specifically, this function can no longer simply return "true" when the value of the top index is less than topMax (after updating topMax), because a single update of the top index by an ongoing operation may make top exceed the topMax value. Therefore, the convertStealableToNonStealable function (which, in this example, is called from within a Pop operation) may be modified as follows:

Note that in this example, the higher S is (e.g. the higher the upper bound on the number of elements that may be stolen at once is), the more likely it will be that a CAS operation must be executed in the convertStealableToNonStealable function. In particular, if no upper bound S is known, then a CAS operation will need to be executed on every call to the convertStealableToNonStealable function. However, even in that extreme case (e.g., the case in which a CAS operation is executed on every call to convertStealableToNonStealable), the modified algorithm presented above is likely to perform better than the original ABP algorithm, because the original ABP algorithm executes a memory barrier on every call to the local Pop operation, and it is likely that the Pop operation is

```
bool convertStealableToNonStealable( ) {
  assert(bottom == topMax - 1);          // (*)
  // Read top
  //
  IndexAndVersion ti = topInfo;
  int numStealable = topMax - ti.index;
  if (numStealable == 0) {
    // Nothing to convert
    //
    // Since this method was called from within a Pop operation only when the owner
    // ran out of non-stealable items (*), that means that the deque is empty.
    // Therefore, this method resets the indexes and returns false.
    //
    bottom = topMax = 0;
    top = {0, ti.version + 1};
    return false;
  }
  // Move topMax to reduce the number of the stealable work items. The new
  // number of stealable work items is decided by a helper function, reduceNumStealable,
  // that returns the new number of stealable work items. The new number of stealable
  // work items is always strictly lower than the old number of stealable work items, or
  // in some cases, the new number may be zero, indicating that no stealing is allowed.
  // Therefore, the function reduceNumStealable must return an integer value that is
  // not less than 0 and strictly less than its argument.
  //
  int newNumStealable = reduceNumStealable(numStealable);
  topMax = ti.index + newNumStealable;
  membar-store-load( );
  ti = topInfo;
  // In the common case, no concurrent steal operations stole or may be trying to steal,
  // the work items being converted. Therefore, because the top index is at
  // least S steps away from topMax, the method is finished, and returns true.
  //
  if (ti.index <= topMax - S) return true;
  // Here, the method tries to update topInfo's version to prevent any ongoing Steal
  // operation that has seen the old value of topMax, but has not yet executed its CAS
  // operation, from succeeding.
  //
  IndexAndVersion new_ti = {ti.index, it.version + 1};
  CAS(&topInfo, ti, new_ti);
  // Here, topInfo can no longer be incremented above the new value of topMax
  // If the CAS succeeded, then any concurrent Steal operation that has
  // seen the old value of topMax will fail updating topInfo.
  // If the CAS failed, then some concurrent Steal operation successfully
  // updated topInfo after topMax was updated. Hence, any other Steal operation
  // will have to retry and will see the new value of topMax.
  //
  // Thus, all left to be done is to update topMax in case that it is lower than
  // the new value of topInfo.index, and determine whether the deque is empty afterward.
  //
  ti = topInfo;
  if (ti.index > topMax) {
    topMax = ti.index;
    if (bottom < topMax) {       // (*)
      // Here, the deque is empty, so this method resets the indexes and returns false.
      //
      bottom = topMax = 0;
      top = {0, ti.index+1};
      return false;
    }
  }
  return true;
}
``` called much more frequently than the convertStealableToNonStealable function.

Figure 7:
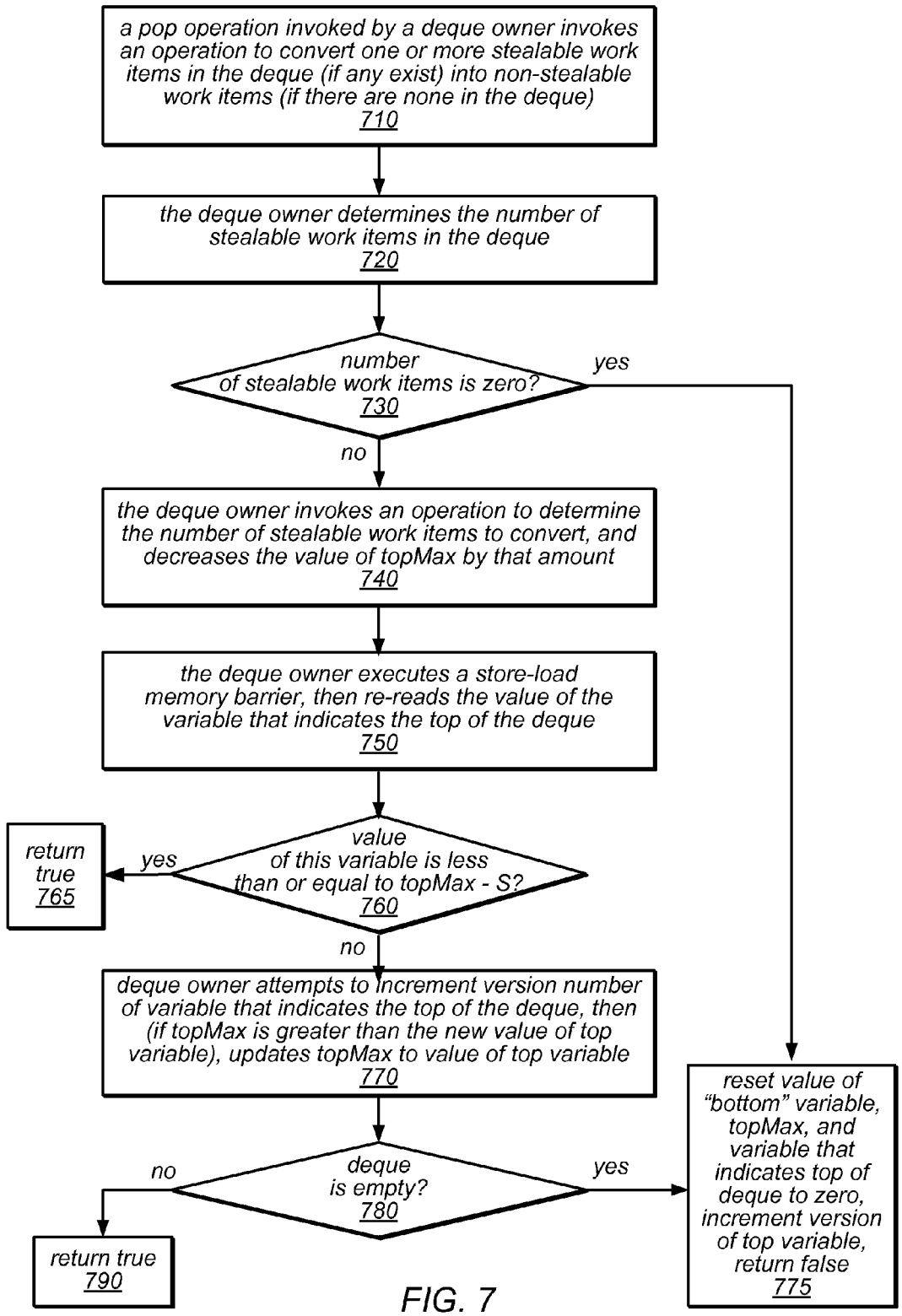
FIG. 7 is a flow diagram illustrating another embodiment of a method for converting stealable work items to non-stealable work items.

Another embodiment of a method for converting stealable work items to non-stealable work items is illustrated by the flow diagram in FIG. 7. In this example, it is assumed that a steal operation is able to steal more than one work item at a time (e.g., up to a pre-determined upper bound, S, on the number of work items that can be stolen in a single steal operation). As illustrated at 710, in this example, the method may include a pop operation that was invoked by a deque owner invoking another operation to convert one or more stealable work items in the deque (if any exist) into non-stealable work items (e.g., if there are no non-stealable work items in the deque). The method may also include the deque owner determining the number of stealable work items in the deque (as in 720). For example, in some embodiments, the number of stealable work items may be calculated as the difference between the value of the topMax variable for the deque and the value of the variable identifying the top of the deque, as previously described.

As illustrated in FIG. 7, if the number of stealable work items is zero (shown as the positive exit from 730), the method may include the deque owner resetting the value of its "bottom" variable, the value of the variable that indicates the top of the deque, and the value of the topMax variable to zero, incrementing the version number of the variable that indicates the top of the deque, and then returning from the operation to convert stealable work items into non-stealable work items with a return value of false (as in 775). This is because the deque must be empty, in this case. However, if the number of stealable work items is non-zero (shown as the negative exit from 730), the method may include the deque owner invoking an operation (e.g., an operation such as the reduceNumStealable function described herein) to determine the number of stealable work items to convert to non-stealable work items, and to decrease the value of the topMax variable by that amount (as in 740). In some embodiments, the number of work items to be converted may be dependent on the particular work-stealing policy that is being applied, e.g., it may be may be dependent on an observed or expected workload, a system-wide, application-specific, or user-configurable work stealing policy and/or the value of a parameter of a system-wide, application-specific, or user-configurable work stealing policy. As illustrated in this example, the method for converting stealable work items to non-stealable work items may also include the deque owner executing a store-load memory barrier, and then re-reading the value of the variable that indicates the top of the deque, as in 750.

If the value of this variable is less than or equal to the difference between the value of the topMax variable and the value of a parameter S (e.g., a pre-determined system-wide, application-specific, or user-configurable upper bound on the number of work items that can be stolen from the deque of another thread within a single steal operation), shown as the positive exit from 760, the method may include returning from the operation to convert stealable work items into non-stealable work items with a return value of true (as in 765). On the other hand, if the value of this variable is not less than the value of the topMax variable by at least S (shown as the negative exit from 760), the method may include the deque owner attempting to increment the version number of the variable that indicates the top of the deque, and then (if the value of topMax is less than the new value of the variable that indicates the top of the deque) updating the value of the topMax variable to the value of this variable (as in 770).

As illustrated in this example, if the deque is empty at this point (shown as the positive exit from 780), the method may include the deque owner resetting the value of the "bottom" variable, the value of the variable that indicates the top of the deque, and the value of the topMax variable to zero, incrementing the version number of the variable that indicates the top of the deque, and then returning from the operation to convert stealable work items into non-stealable work items with a return value of false (as in 775). On the other hand, if the deque is not empty (shown as the negative exit from 780), the method may include the deque owner returning from the operation to convert stealable work items into non-stealable work items with a return value of true (as in 790).

As previously noted, in some embodiments, different representations may be employed for stealable work items than for non-stealable work items. For example, in some embodiments, there may be flexibility for the owner of a deque with respect to handling and storing work items in the non-stealable portion of the deque. In particular, the owner may not need to treat the non-stealable portion of the array as a queue from which it can only remove (or Pop) the elements at one end. Instead, in various embodiments, the owner may be able to read all elements in the portion of the array that holds non-stealable work items, reorder non-stealable work items, unite multiple non-stealable work items into one non-stealable work items, etc.

In some embodiments, the owner may have some context information that is needed for execution of the work items it puts in its deque. If any such work item can be stolen (e.g., if a given work item is stealable), at least some of this context may need to be stored together with the work item in the deque. However, by maintaining a separation between stealable work items and non-stealable work items, the owner may avoid the overhead of storing such information in the deque for a non-stealable work item until and unless the owner decides to make that work item stealable. Thus, in the common case (in which most work items are not stolen, but are removed and executed by the owner), the owner may avoid this overhead for most of the work items it generates. Moreover, because of the above-mentioned flexibility of processing and reordering non-stealable work items in the deque, in some embodiments, the owner may be able to decide which (if any) non-stealable work items to make stealable, and not just how many non-stealable work items to make stealable. Finally, in some embodiments, the owner may be able to hold at least some of the non-stealable work items in a separate data structure. In such embodiments, the owner may only move non-stealable work items into a deque that holds both stealable and non-stealable items when it wants to make the non-stealable work items stealable.

As previously noted, in some embodiments, the owner may have the ability to disable stealing. For example, in some embodiments, the owner may temporarily disable stealing by setting topMax to be equal to top.index, using a procedure that is similar to that of the convertStealableToNonStealable function described herein. In such embodiments, by doing so, the owner may enjoy the above-mentioned flexibility of reading and/or rearranging all of the work items in the deque without any interference from thieves. When the owner has finished performing such reading and/or rearranging, the owner may re-enable stealing by setting topMax to a value between top and bottom, as is done by the perhapsAddStealableWorkItems function described herein.

In some embodiments, the work-stealing techniques described herein in which a separation is maintained between stealable and non-stealable work items may be more cache friendly to the owner in the presence of stealing than the original ABP algorithm. For example, with the original ABP algorithm, every Steal operation has to read both the top and bottom indexes, and the owner has to modify the bottom index on every local Push or Pop operation. Therefore, the cache line holding the bottom has to be transferred back and forth between shared and exclusive states when alternating between Steal operations performed by the thieves and local Pop or Push operations performed by the owner. In some embodiments of the ABP deque variants described herein, the thieves may read topMax instead of the bottom index, and topMax may be modified much more rarely than the bottom index. Thus, most of the time, the cache line holding topMax stays in shared mode, and the cache line holding the bottom index stays in exclusive mode. Therefore, the bottom index may be updated more quickly than in the original ABP algorithm.

Figure 8A:
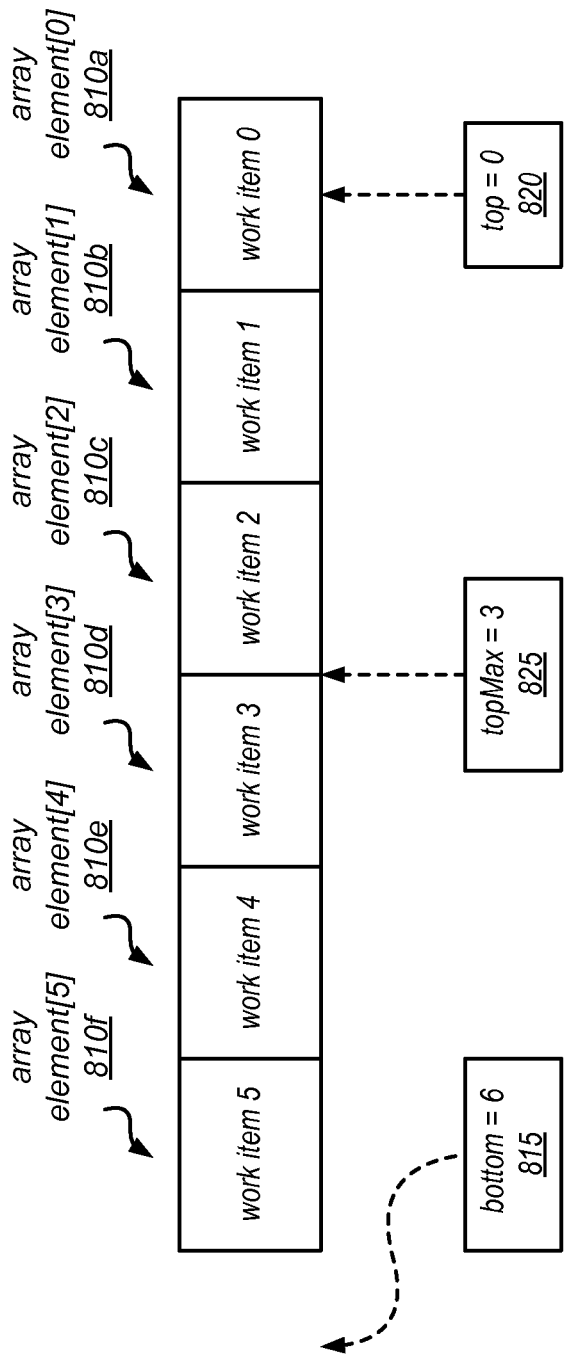
FIGS. 8A-8E are block diagrams illustrating the use of the work stealing techniques described herein, according to one embodiment.

The work stealing techniques described herein may be further illustrated by the block diagrams in FIGS. 8A-8E, according to one embodiment. For example, FIG. 8A illustrates a double-ended queue (e.g., deque 800) that contains both stealable and non-stealable work items. In this example, six work items (e.g., work items 0-5, shown as array elements 810a-810f) have been added to the double-ended queue, and none have been removed by the owner or stolen by another thread. In this example, the "bottom" variable 815 associated with deque 800 has a value of 6, indicating that the next available element of the double-ended queue will be array element [6]. In this example, the "topMax" variable 825 associated with deque 800 has a value of 3, indicating the separation between stealable and non-stealable work items in the double-ended queue occurs at position 3 in the array. For example, a topMax value of 3 may indicate that the last stealable work item in the double-ended queue is in the position identified by the expression (topMax−1) (e.g., array element [2], shown as 810c), and that the first non-stealable work item is in the position identified by the value of topMax (e.g., array element [3], shown as 810d). Finally, in this example, the value of the variable indicating the "top" of the array (e.g., variable 820) is zero, indicating that array element [0] (shown as 810a) is at the top of the double-ended queue (e.g., it is the first, and possibly the oldest, element in the double-ended queue).

Figure 8B:
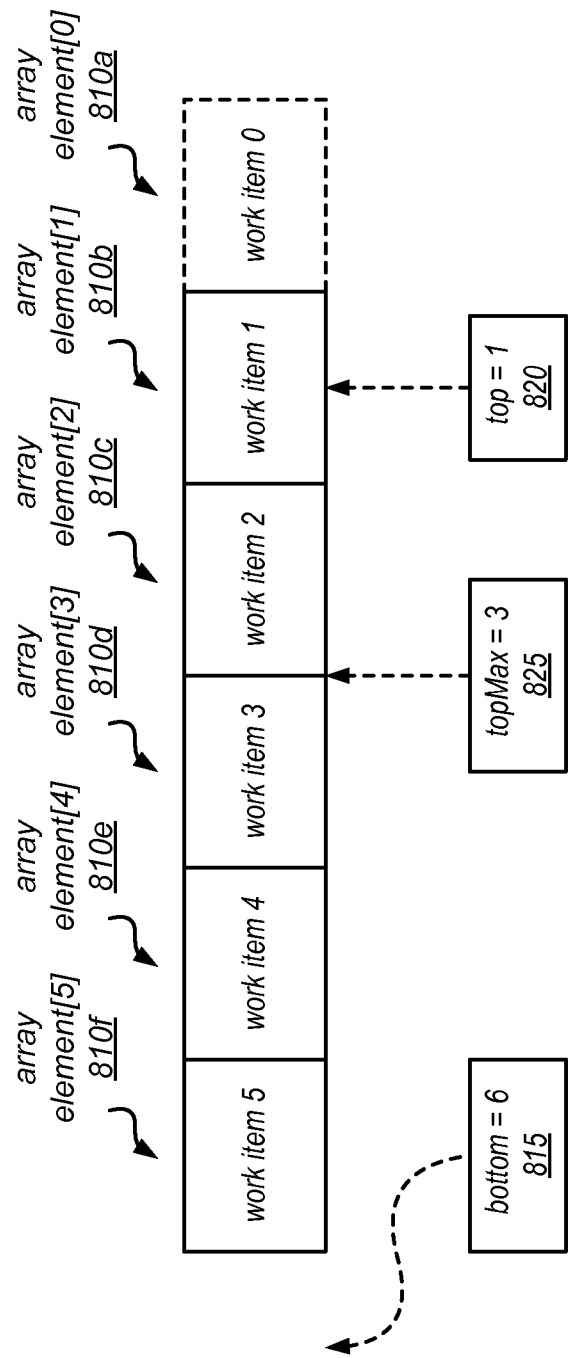

FIG. 8B illustrates deque 800 after work item 0 (i.e., array element [0], shown as 810a) has been stolen by another thread. In this example, the value of the "top" variable 820 has been updated to a value of 1 to indicate that the new top of the double-ended queue (following the removal of the work item that was stolen) is work item 1 (i.e., array element [1], shown as 810b). Note that, in some embodiments, array (or deque) elements may be removed (freed) after the corresponding work items are stolen. In other embodiments, they may be reused by the work-stealing algorithm (e.g., for additional deque elements having different index values).

Figure 8C:
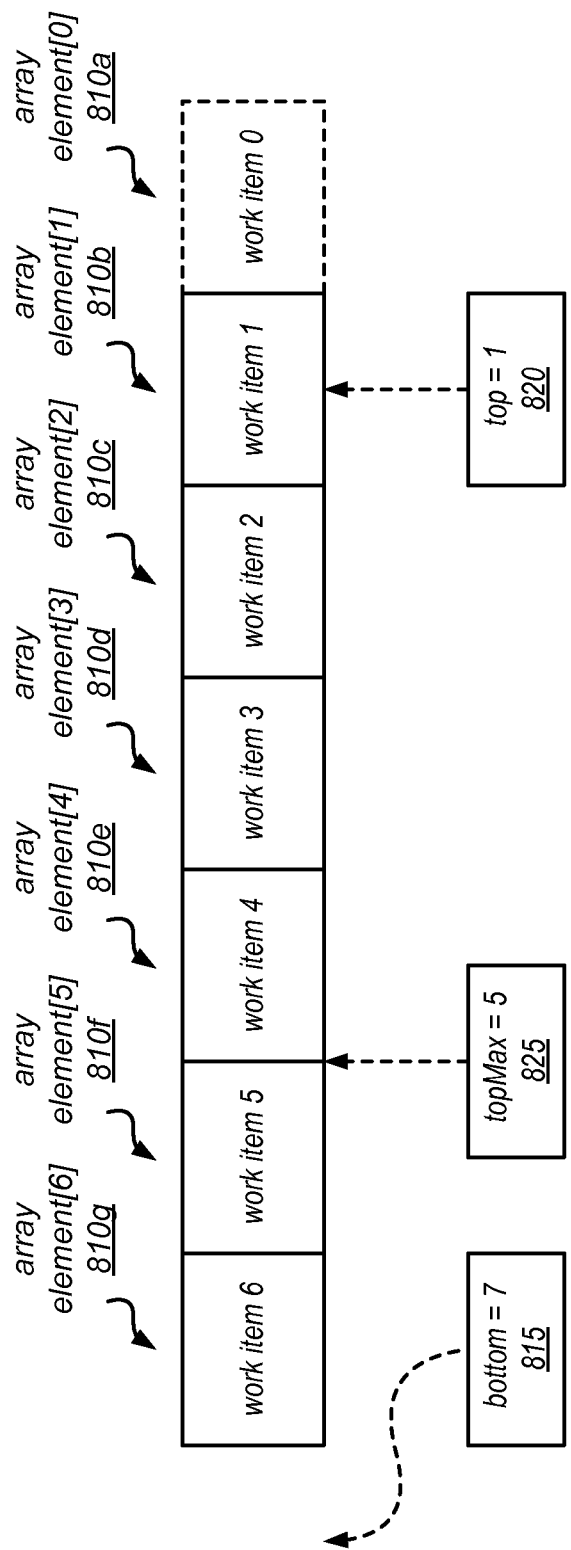

FIG. 8C illustrates deque 800 after a new work item (i.e., work item 6) has been added to the double-ended queue as array element [6] (shown as 810f) by the owner of deque 800 (e.g., using a push operation). In this example, adding the new element to the double-ended queue resulted in updating the value of the "bottom" variable 815 to a value of 7 (indicating that the next available array element will be array element [7]). In this example, as a result of the push operation, the number of stealable work items in the double-ended queue was increased by updating the value of the topMax variable to 5. For example, a topMax value of 5 may indicate that the last stealable work item in the double-ended queue is in the position identified by the expression (topMax−1) (e.g., array element [4], shown as 810e), and that the first non-stealable work item is in the position identified by the value of topMax (e.g., array element [5], shown as 810f). Finally, in this example, the value of the variable indicating the "top" of the array (e.g., variable 820) is 1, indicating that array element [1] (shown as 810b) is at the top of the double-ended queue (e.g., it is the first, and possibly the oldest, element in the double-ended queue, at this point).

Figure 8D:
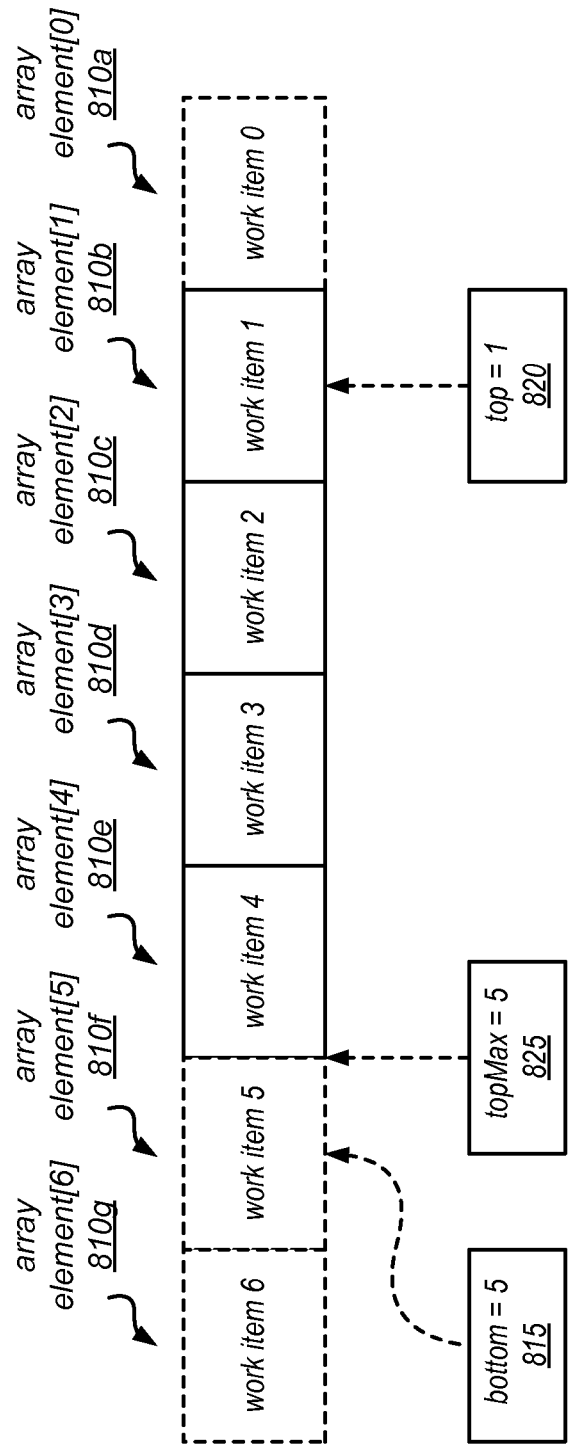
Figure 8E:
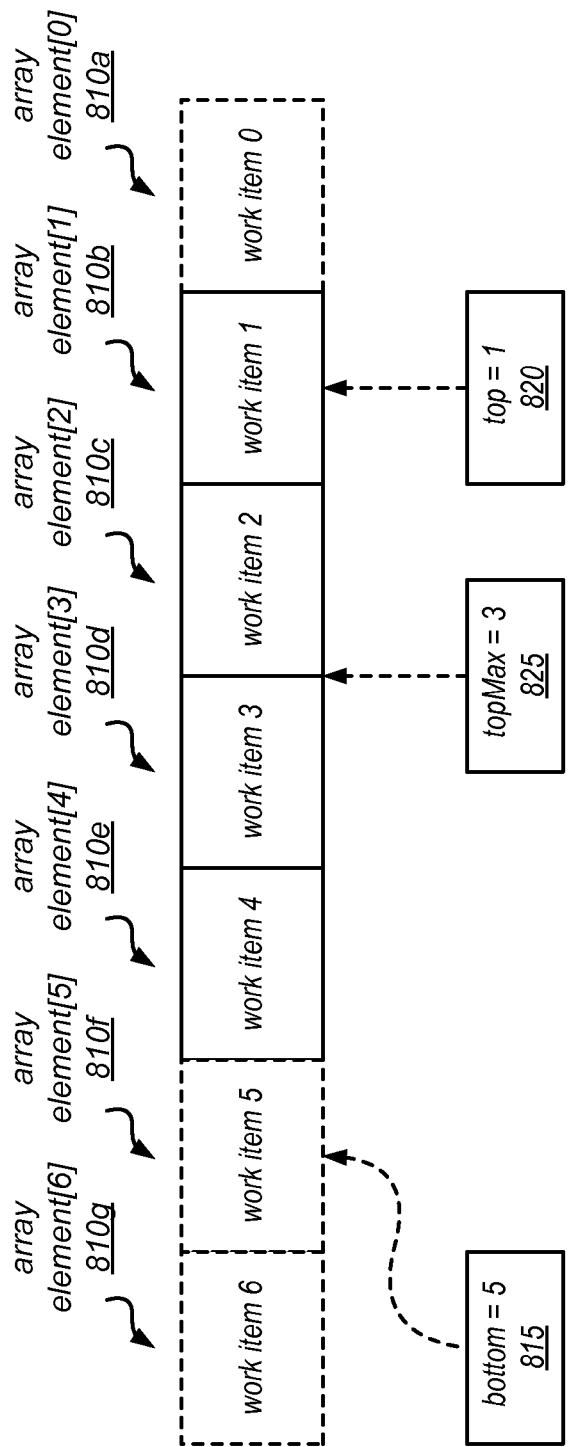

FIG. 8D illustrates deque 800 after its owner has removed work item 5 and work item 6 (i.e., array element [5] and array element [6], shown as 810f and 810g) and executed them. In this example, removing the these two work item results in the value of the "bottom" variable 815 being decreased by two (to a value of 5), so that it now points to the next available non-stealable work item slot (i.e., array element [5], at 8100, which is empty. Note that, in some embodiments, array (or deque) elements may be removed (freed) after the corresponding work items are popped by the owner. In other embodiments, they may be reused by the work-stealing algorithm (e.g., for additional deque elements having different index values). Since there are no non-stealable work items in deque 800 following this operation, the owner of deque 800 may be configured to convert stealable work item 3 and stealable work item 4 (i.e., array element [3] and array element [4], shown as 810d and 810e) to be non-stealable work items by updating the value of the topMax variable 825 to a value of 3. The result of this operation is illustrated in FIG. 8E. In this example, a topMax value of 3 may indicate that the last stealable work item in the double-ended queue is in the position identified by the expression (topMax−1) (e.g., array element [2], shown as 810c), and that the first non-stealable work item is in the position identified by the value of topMax (e.g., array element [3], shown as 810d). Note that, in this example, if the owner of the deque wanted to disable work-stealing entirely, the deque owner could update topMax to a value of 1. This would indicate that none of the work items in deque 800 were stealable (i.e., that all of them are non-stealable).

Figure 9:
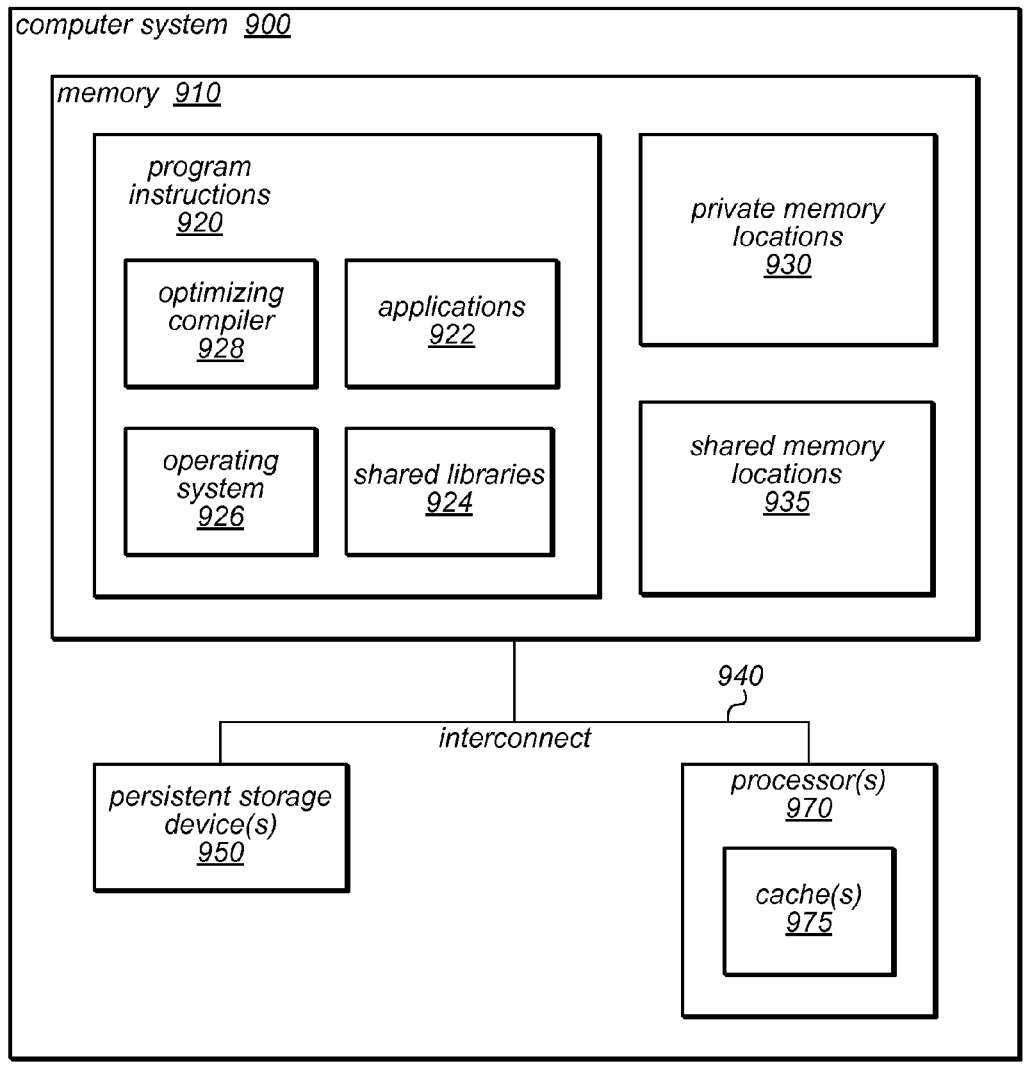
FIG. 9 is a block diagram illustrating a computing system configured to implement work stealing using a dynamically configurable separation of stealable and non-stealable work items, according to various embodiments.

The techniques described herein for implementing work stealing using a dynamically configurable separation between stealable and non-stealable work items may be implemented on or by any of a variety of computing systems, in different embodiments. FIG. 9 illustrates a computing system 900 that is configured to implement work stealing using a dynamically configurable separation of stealable and non-stealable work items and/or various methods for adding or removing work items from pools of work items that include both stealable and non-stealable work items or for adjusting the number of stealable and non-stealable work items in such pools, according to various embodiments. The computer system 900 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The mechanisms for implementing work stealing using a dynamically configurable separation of stealable and non-stealable work items, as described herein, may be provided as a computer program product, or software, that may include a non-transitory, computer-readable storage medium having stored thereon instructions, which may be used to program a computer system 900 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 900 may include one or more processors 970; each may include multiple cores, any of which may be single or multithreaded. For example, multiple processor cores may included in a single processor chip (e.g., a single processor 970), and multiple processor chips may be included in computer system 900. Each of the processors 970 may include a cache or a hierarchy of caches 975, in various embodiments. For example, each processor chip 970 may include multiple L1 caches (e.g., one per processor core) and one or more other caches (which may be shared by the processor cores on a single processor). The computer system 900 may also include one or more persistent storage devices 950 (e.g. optical storage, magnetic storage, hard drive, tape drive, solid state memory, etc) and one or more system memories 910 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 9 (e.g., video cards, audio cards, additional network interfaces, peripheral devices, a network interface such as an ATM interface, an Ethernet interface, a Frame Relay interface, etc.)

The one or more processors 970, the storage device(s) 950, and the system memory 910 may be coupled to the system interconnect 940. One or more of the system memories 910 may contain program instructions 920. Program instructions 920 may be executable to implement one or more applications 922 (which may include application source code and/or executable application code that generates work items, adds work items to pools of work items that include both stealable and non-stealable work items, adjusts the number of stealable and non-stealable work items in such pools, and/or removes work items from such pools, as described herein), shared libraries 924, or operating systems 926. In some embodiments, program instructions 920 may include an optimizing compiler 928. In some embodiments, program instructions 920 may be executable to implement a contention manager (not shown). In some embodiments, program instructions 920 may also be configured to implement a transaction support library, which provides various methods for implementing atomic transactions (e.g., within shared libraries 924 or elsewhere within program instructions 920). In some embodiments, a transaction support library may include functionality to execute transactions according to various hardware and/or software transactional memory techniques. For example, in some embodiments, applications 922 may make calls into a transaction support library for beginning and ending (i.e., committing) transactions, and/or for performing one or more accesses to shared memory locations 935 (e.g., locations within a shared transactional memory space) from within transactions.

Program instructions 920 may be encoded in platform native binary, any interpreted language such as Java™ bytecode, or in any other language such as C/C++, Java™, etc or in any combination thereof. In various embodiments, optimizing compiler 928, applications 922, operating system 926, and/or shared libraries 924 may each be implemented in any of various programming languages or methods. For example, in one embodiment, optimizing compiler 928 and operating system 926 may be JAVA based, while in another embodiment they may be written using the C or C++ programming languages. Similarly, applications 922 may be written using Java, C, C++, or another programming language, according to various embodiments. Moreover, in some embodiments, optimizing compiler 928, applications 922, operating system 926, and/shared libraries 924 may not be implemented using the same programming language. For example, applications 922 may be C++ based, while optimizing compiler 928 may be developed using C.

The program instructions 920 may include any or all of the functions, operations, or procedures, and/or other processes for implementing work stealing using a dynamically configurable separation of stealable and non-stealable work items, as described herein. Such support and functions may exist in one or more of the shared libraries 924, operating systems 926, or applications 922, in various embodiments. The system memory 910 may further comprise private memory locations 930 and/or shared memory locations 935 where data may be stored. For example, shared memory locations 935 may include locations in a shared transactional memory space, which may support and/or be accessed by transactions in a software transactional memory implementation, a hardware transactional memory implementation, and/or a hardware-software hybrid transactional memory implementation, in different embodiments. In some embodiments, shared memory locations 935 may store data or other shared resources that are accessible to multiple, concurrently executing threads, processes, or transactions, in various embodiments. In some embodiments, shared memory locations 935 may store data representing various pools of work items (e.g., as arrays, queues, or double-ended queues of work items), and/or metadata values associated with such pools. For example, shared memory locations 935 may store the value of a variable that indicates the first element in such a pool (e.g., the "top" index of the pool/array/deque), the value of a variable that indicates the last element in such a pool (e.g., the "bottom" index of the pool/array/deque), or the value of a variable that indicates the position in the pool/array/deque that separates the stealable work items in the pool/array/deque and the non-stealable work items in the pool/array/deque (e.g., a "topMax" variable). In some embodiments, the system memory 910 and/or any of the caches of processor(s) 970 may, at various times, store recorded values of local variables and/or various fields of the nodes that make up a pool/array/deque of work items (e.g., in private memory locations 930), or other work-stealing related metadata (e.g., values indicating the "top", "bottom", or "topMax" positions in the pool/array/deque, or an upper bound on the number of work items that can be stolen during a single steal operation), as described herein, and/or any other data usable in implementing the techniques described herein (including data describing trigger conditions or work-stealing policy parameters), some of which may include values that are configurable by the programmer or by a user.

Although the embodiments above have been described in considerable detail, numerous variations and modifications will become apparent to those skilled in the art once the above disclosure is fully appreciated. For example, although many of the embodiments are described in terms of particular types of data structures and particular popping, pushing, and pool adjustment procedures, it should be noted that the techniques and mechanisms disclosed herein for implementing work stealing using configurable separation of stealable and non-stealable work items may be applicable in other contexts and/or using structures and procedures other than those described in the examples herein. It is intended that the following claims be interpreted to embrace all such variations and modifications.

What is claimed:

1. A method, comprising:
performing, by a computer:
beginning execution of a multithreaded application;
adding, by a given thread of the application to a pool of work items that were generated by the given thread, a work item, wherein the pool of work items is configured to hold a number of work items that are stealable by other threads and a number of work items that are not stealable by other threads, and wherein the number of work items in the pool of work items that are stealable by other threads is adjustable by the given thread during execution of the multithreaded application;
determining, by the given thread, that there are not sufficient stealable work items in the pool of work items; and
converting, by the given thread and in response to determining that there are not sufficient stealable work items in the pool of work items, one or more work items that are not stealable into work items that are stealable;
wherein, prior to converting the one or more work items that are not stealable into work items that are stealable, the one or more work items that are not stealable are stored in either or both of:
a representation in which an amount of context information needed for execution of the work items that is included in the representation is less than an amount of context information needed for execution that is included in a representation used to represent stealable work items, or
a different data structure than a data structure in which work items that are stealable are stored.

2. The method of claim 1, wherein said determining that there are not sufficient stealable work items in the pool of work items is dependent on a work-stealing policy specifying one or more of: a condition that, when met, triggers an operation to convert one or more work items that are not stealable into work items that are stealable, a number of work items to be converted from work items that are not stealable into work items that are stealable, a percentage of work items to be converted from work items that are not stealable into work items that are stealable, a ratio between work items that are not stealable and work items that are stealable that is to be met as a result of said converting, or a frequency at which said determining is performed.

3. The method of claim 1, wherein said determining that there are not sufficient stealable work items in the pool of work items is dependent on one or more of: the number of work items in the pool of work items that are stealable, the number of work items in the pool of work items that are not stealable, a ratio between the number of work items in the pool of work items that are stealable and the number of work items in the pool of work items that are not stealable, or a ratio between the number of work items in the pool of work items that are stealable and the total number of work items in the pool of work items.

4. The method of claim 1, further comprising:
removing, by the given thread, a work item that is not stealable from the pool of work items;
executing, by the given thread, the removed work item;
determining, by the given thread, that there are no other work items in the pool of work items that are not stealable; and
converting, by the given thread in response to determining that there are no other work items in the pool of work items that are not stealable, one or more stealable work items in the pool of work items into work items that are not stealable.

5. The method of claim 4, wherein said removing a work item comprises removing a work item other than a work item in the pool of work items that was most recently added to the pool of work items.

6. The method of claim 1, wherein converting the one or more work items that are not stealable into work items that are stealable comprises converting the one or more work items that are not stealable into the representation used to represent stealable work items or moving the one or more work items that are not stealable into the data structure in which work items that are stealable are stored.

7. The method of claim 1, further comprising:
determining, by the given thread, that there are no other work items in the pool of work items; and
in response to determining that there are no other work items in the pool of work items:
stealing, by the given thread, a work item that is stealable from a pool of work items generated by another thread, wherein the pool of work items generated by the other thread comprises at least one work item that is stealable by other threads; and
executing, by the given thread, the stolen work item.

8. The method of claim 1, further comprising:
determining, by the given thread, that there are no other work items in the pool of work items; and
in response to determining that there are no other work items in the pool of work items:
stealing, by the given thread, within a single steal operation, two or more work items that are stealable from a pool of work items generated by another thread, wherein the pool of work items generated by the other thread comprises multiple work items that are stealable by other threads; and
executing, by the given thread, the stolen work items.

9. The method of claim 1, further comprising:
the given thread determining, by the given thread, that stealing work items from the pool of work items is to be disabled; and
converting, by the given thread in response to determining that stealing work items from the pool of work items is to be disabled, all stealable work items in the pool of work items into work items that are not stealable.

10. The method of claim 1,
wherein the pool of work items is represented by an array of work items;
wherein a variable indicates a position separating the last stealable work item in the array and the first work item in the array that is not stealable; and
wherein said converting one or more work items that are not stealable into work items that are stealable comprises modifying the value of the variable.

11. The method of claim 1,
wherein the pool of work items is represented by an array of work items;
wherein a variable indicates a position separating the last stealable work item in the array and the first work item in the array that is not stealable; and wherein the method further comprises:
converting one or more stealable work items in the pool of work items into work items that are not stealable, wherein said converting one or more stealable work items in the pool of work items into work items that are not stealable comprises modifying the value of the variable.

12. The method of claim 1,
wherein the pool of work items is represented by a double-ended queue of work items;
wherein a variable indicates a position separating the last stealable work item in the double-ended queue of work items and the first work item in the double-ended queue of work items that is not stealable;
wherein said adding a work item to the pool of work items comprises adding the work item to a bottom end of the double-ended queue of work items;
wherein the method further comprises:
removing, by another thread, a stealable work item from a top end of the double-ended queue of work items; and
wherein said converting one or more work items that are not stealable into work items that are stealable comprises modifying the value of the variable.

13. A system, comprising:
one or more processor cores; and
a memory coupled to the one or more processor cores and storing program instructions that when executed on the one or more processor cores cause the one or more processor cores to perform:
  beginning execution of a multithreaded application;
  adding, by a given thread of the application to a pool of work items that were generated by the given thread, a work item, wherein the pool of work items is configured to hold a number of work items that are stealable by other threads and a number of work items that are not stealable by other threads, and wherein the number of work items in the pool of work items that are stealable by other threads is adjustable by the given thread during execution of the multithreaded application;
  determining, by the given thread, that there are not sufficient stealable work items in the pool of work items; and
  converting, by the given thread and in response to determining that there are not sufficient stealable work items in the pool of work items, one or more work items that are not stealable into work items that are stealable;
  wherein, prior to converting the one or more work items that are not stealable into work items that are stealable, the one or more work items that are not stealable are stored in either or both of:
    a representation in which an amount of context information needed for execution of the work items that is included in the representation is less than an amount of context information needed for execution that is included in a representation used to represent stealable work items, or
    a different data structure than a data structure in which work items that are stealable are stored.

14. The system of claim 13, wherein when executed on the one or more processor cores, the program instructions further cause the one or more processor cores to perform:
the given thread removing a work item that is not stealable from the pool of work items;
the given thread executing the removed work item;
the given thread determining that there are no other work items in the pool of work items that are not stealable; and
in response to determining that there are no other work items in the pool of work items that are not stealable, the given thread converting one or more stealable work items in the pool of work items into work items that are not stealable.

15. The system of claim 13, wherein when executed on the one or more processor cores, the program instructions further cause the one or more processor cores to perform:
the given thread determining that there are no other work items in the pool of work items; and
in response to determining that there are no other work items in the pool of work items:
  the given thread stealing a work item that is stealable from a pool of work items generated by another thread, wherein the pool of work items generated by the other thread comprises at least one work item that is stealable by other threads; and
  the given thread executing the stolen work item.

16. The system of claim 13,
wherein the pool of work items is represented by an array of work items;
wherein a variable indicates a position separating the last stealable work item in the array and the first work item in the array that is not stealable;
wherein said converting one or more work items that are not stealable into work items that are stealable comprises modifying the value of the variable; and
wherein when executed on the one or more processor cores, the program instructions further cause the one or more processor cores to perform:
  converting one or more stealable work items in the pool of work items into work items that are not stealable, wherein said converting one or more stealable work items in the pool of work items into work items that are not stealable comprises modifying the value of the variable.

17. A non-transitory, computer-readable storage medium storing program instructions that when executed on one or more computers cause the one or more computers to perform:
  beginning execution of a multithreaded application;
  adding, by a given thread of the application to a pool of work items that were generated by the given thread, a work item, wherein the pool of work items is configured to hold a number of work items that are stealable by other threads and a number of work items that are not stealable by other threads, and wherein the number of work items in the pool of work items that are stealable by other threads is adjustable by the given thread during execution of the multithreaded application;
  determining, by the given thread, that there are not sufficient stealable work items in the pool of work items; and
  converting, by the given thread and in response to determining that there are not sufficient stealable work items in the pool of work items, one or more work items that are not stealable into work items that are stealable;
  wherein, prior to converting the one or more work items that are not stealable into work items that are stealable, the one or more work items that are not stealable are stored in either or both of:
    a representation in which an amount of context information needed for execution of the work items that is included in the representation is less than an amount of context information needed for execution that is included in a representation used to represent stealable work items, or a different data structure than a data structure in which work items that are stealable are stored.

18. The non-transitory, computer-readable storage medium of claim 17, wherein when executed on the one or more computers, the program instructions further cause the one or more computers to perform:
the given thread removing a work item that is not stealable from the pool of work items;
the given thread executing the removed work item;
the given thread determining that there are no other work items in the pool of work items that are not stealable; and
in response to determining that there are no other work items in the pool of work items that are not stealable, the given thread converting one or more stealable work items in the pool of work items into work items that are not stealable.

19. The non-transitory, computer-readable storage medium of claim 17, wherein when executed on the one or more computers, the program instructions further cause the one or more computers to perform:
the given thread determining that there are no other work items in the pool of work items; and
in response to determining that there are no other work items in the pool of work items:
the given thread stealing a work item that is stealable from a pool of work items generated by another thread, wherein the pool of work items generated by the other thread comprises at least one work item that is stealable by other threads; and
the given thread executing the stolen work item.

20. The non-transitory, computer-readable storage medium of claim 17,
wherein the pool of work items is represented by an array of work items;
wherein a variable indicates a position separating the last stealable work item in the array and the first work item in the array that is not stealable;
wherein said converting one or more work items that are not stealable into work items that are stealable comprises modifying the value of the variable; and
wherein when executed on the one or more computers, the program instructions further cause the one or more computers to perform:
converting one or more stealable work items in the pool of work items into work items that are not stealable, wherein said converting one or more stealable work items in the pool of work items into work items that are not stealable comprises modifying the value of the variable.

* * * * *